US012573227B2

(12) United States Patent
Sathi et al.

(10) Patent No.: US 12,573,227 B2
(45) Date of Patent: Mar. 10, 2026

(54) METHOD AND SYSTEM FOR EXTRACTION OF DATA FROM DOCUMENTS FOR ROBOTIC PROCESS AUTOMATION

(71) Applicant: Automation Anywhere, Inc., San Jose, CA (US)

(72) Inventors: Siddarth Sathi, San Jose, CA (US); Vibhas Gejji, San Jose, CA (US); Anish Hiranandani, San Jose, CA (US); Bruno Gomes Selva, San Jose, CA (US); Anjana Prabhakar, Sunnyvale, CA (US)

(73) Assignee: Automation Anywhere, Inc., San Jose, CA (US)

( * ) Notice: Subject to any disclaimer, the term of this patent is extended or adjusted under 35 U.S.C. 154(b) by 668 days.

(21) Appl. No.: 17/160,080

(22) Filed: Jan. 27, 2021

(65) Prior Publication Data

US 2022/0108108 A1 Apr. 7, 2022

Related U.S. Application Data

(60) Provisional application No. 63/087,847, filed on Oct. 5, 2020, provisional application No. 63/087,851, filed
(Continued)

(51) Int. Cl.
*G06V 30/416* (2022.01)
*G06F 16/242* (2019.01)
(Continued)

(52) U.S. Cl.
CPC .......... *G06V 30/416* (2022.01); *G06F 16/243* (2019.01); *G06F 40/00* (2020.01);
(Continued)

(58) Field of Classification Search
CPC .............. G06V 30/416; G06V 30/153; G06V 30/19173; G06V 30/40; G06V 30/412;
(Continued)

(56) References Cited

U.S. PATENT DOCUMENTS

| | | | |
|---|---|---|---|
| 5,949,999 A | 9/1999 | Song et al. | |
| 5,983,001 A | 11/1999 | Boughner et al. | |

(Continued)

FOREIGN PATENT DOCUMENTS

| | | | |
|---|---|---|---|
| CN | 110795919 A | * | 9/1995 |
| WO | 2019/092672 A2 | | 5/2019 |
| WO | WO 2022/076488 | | 4/2022 |

OTHER PUBLICATIONS

International Search Report and Written Opinion for PCT/US2021/015691, mailed May 11, 2021.
(Continued)

*Primary Examiner* — Gregory A Morse
*Assistant Examiner* — Stefano Anthony Dardano
(74) *Attorney, Agent, or Firm* — Jason A. Smith; Shumaker, Loop & Kendrick, LLP

(57) ABSTRACT

Improved techniques to access content from documents in an automated fashion. The improved techniques permit extraction of data from documents, namely, images of documents. The extraction processing can be hierarchical, such as being performed in multiple levels (i.e., multi-leveled). At an upper level, numerous different objects within a document can be detected along with positional data for the objects and can be categorized based on a type of object. Then, at lower levels, the different objects can be processed differently depending on the type of object. As a result, data extraction from the document can be performed with greater reliability and precision.

12 Claims, 24 Drawing Sheets

Related U.S. Application Data on Oct. 5, 2020, provisional application No. 63/087,844, filed on Oct. 5, 2020.

(51) Int. Cl.

| | |
|---|---|
| *G06F 40/00* | (2020.01) |
| *G06F 40/177* | (2020.01) |
| *G06F 40/20* | (2020.01) |
| *G06F 40/279* | (2020.01) |
| *G06N 3/045* | (2023.01) |
| *G06N 20/00* | (2019.01) |
| *G06Q 10/10* | (2023.01) |
| *G06Q 40/12* | (2023.01) |
| *G06V 30/00* | (2022.01) |
| *G06V 30/148* | (2022.01) |
| *G06V 30/19* | (2022.01) |
| *G06V 30/40* | (2022.01) |
| *G06V 30/412* | (2022.01) |
| *G06V 30/413* | (2022.01) |
| *G06V 30/414* | (2022.01) |

(52) U.S. Cl.
CPC ............ *G06F 40/177* (2020.01); *G06F 40/20* (2020.01); *G06F 40/279* (2020.01); *G06N 3/045* (2023.01); *G06N 20/00* (2019.01); *G06Q 10/10* (2013.01); *G06Q 40/12* (2013.12); *G06V 30/00* (2022.01); *G06V 30/153* (2022.01); *G06V 30/19173* (2022.01); *G06V 30/40* (2022.01); *G06V 30/412* (2022.01); *G06V 30/413* (2022.01); *G06V 30/414* (2022.01)

(58) Field of Classification Search
CPC .. G06V 30/413; G06V 30/414; G06F 16/243; G06F 40/177; G06F 40/20; G06F 40/279; G06N 3/045; G06N 20/00; G06N 3/044; G06Q 10/10; G06Q 40/12
See application file for complete search history.

(56) References Cited

U.S. PATENT DOCUMENTS

| | | | |
|---|---|---|---|
| 6,133,917 | A | 10/2000 | Feigner et al. |
| 6,226,407 | B1 | 5/2001 | Zabih et al. |
| 6,389,592 | B1 | 5/2002 | Ayres et al. |
| 6,427,234 | B1 | 7/2002 | Chambers et al. |
| 6,473,794 | B1 | 10/2002 | Guheen et al. |
| 6,496,979 | B1 | 12/2002 | Chen et al. |
| 6,640,244 | B1 | 10/2003 | Bowman-Amuah |
| 6,704,873 | B1 | 3/2004 | Underwood |
| 6,898,764 | B2 | 5/2005 | Kemp |
| 6,954,747 | B1 | 10/2005 | Wang et al. |
| 6,957,186 | B1 | 10/2005 | Guheen et al. |
| 7,091,898 | B2 | 8/2006 | Arling et al. |
| 7,246,128 | B2 | 7/2007 | Jordahl |
| 7,398,469 | B2 | 7/2008 | Kisamore et al. |
| 7,441,007 | B1 | 10/2008 | Kirkpatrick et al. |
| 7,533,096 | B2 | 5/2009 | Rice et al. |
| 7,568,109 | B2 | 7/2009 | Powell et al. |
| 7,571,427 | B2 | 8/2009 | Wang et al. |
| 7,765,525 | B1 | 7/2010 | Davidson et al. |
| 7,783,135 | B2 * | 8/2010 | Gokturk .................. G06F 18/22 |
| | | | 382/209 |
| 7,805,317 | B2 | 9/2010 | Khan et al. |
| 7,805,710 | B2 | 9/2010 | North |
| 7,810,070 | B2 | 10/2010 | Nasuti et al. |
| 7,846,023 | B2 | 12/2010 | Evans et al. |
| 8,028,269 | B2 | 9/2011 | Bhatia et al. |
| 8,056,092 | B2 | 11/2011 | Allen et al. |
| 8,095,910 | B2 | 1/2012 | Nathan et al. |
| 8,132,156 | B2 | 3/2012 | Malcolm |

| | | | |
|---|---|---|---|
| 8,209,738 | B2 | 6/2012 | Nicol et al. |
| 8,234,622 | B2 | 7/2012 | Meijer et al. |
| 8,245,215 | B2 | 8/2012 | Extra |
| 8,352,464 | B2 | 1/2013 | Folev |
| 8,365,147 | B2 | 1/2013 | Grechanik |
| 8,396,890 | B2 | 3/2013 | Lim |
| 8,438,558 | B1 | 5/2013 | Adams |
| 8,443,291 | B2 | 5/2013 | Ku et al. |
| 8,464,240 | B2 | 6/2013 | Fritsch et al. |
| 8,498,473 | B2 | 7/2013 | Chong et al. |
| 8,504,803 | B2 | 8/2013 | Shukla |
| 8,631,458 | B1 | 1/2014 | Banerjee |
| 8,682,083 | B2 | 3/2014 | Kumar et al. |
| 8,713,003 | B2 | 4/2014 | Fotev |
| 8,724,907 | B1 | 5/2014 | Sampson et al. |
| 8,769,482 | B2 | 7/2014 | Batey et al. |
| 8,819,241 | B1 | 8/2014 | Washbum |
| 8,832,048 | B2 | 9/2014 | Lim |
| 8,874,685 | B1 | 10/2014 | Hollis et al. |
| 8,943,493 | B2 | 1/2015 | Schneider |
| 8,965,905 | B2 | 2/2015 | Ashmore et al. |
| 8,966,458 | B2 | 2/2015 | Asai |
| 9,032,314 | B2 | 5/2015 | Mital et al. |
| 9,104,294 | B2 | 8/2015 | Forstall et al. |
| 9,171,359 | B1 | 10/2015 | Lund |
| 9,213,625 | B1 | 12/2015 | Schrage |
| 9,251,413 | B2 | 2/2016 | Meler |
| 9,278,284 | B2 | 3/2016 | Ruppert et al. |
| 9,444,844 | B2 | 9/2016 | Edery et al. |
| 9,462,042 | B2 | 10/2016 | Shukla et al. |
| 9,571,332 | B2 | 2/2017 | Subramaniam et al. |
| 9,600,519 | B2 | 3/2017 | Schoning et al. |
| 9,621,584 | B1 | 4/2017 | Schmidt et al. |
| 9,934,063 | B2 | 4/2018 | Kania |
| 9,934,129 | B1 | 4/2018 | Budurean |
| 9,946,233 | B2 | 4/2018 | Brun et al. |
| 9,965,139 | B2 | 5/2018 | Nychis |
| 9,990,347 | B2 | 6/2018 | Raskovic et al. |
| 10,015,503 | B1 | 7/2018 | Ahammad |
| 10,043,255 | B1 | 8/2018 | Pathapati et al. |
| 10,282,280 | B1 | 5/2019 | Gouskova |
| 10,489,682 | B1 | 11/2019 | Kumar et al. |
| 10,592,738 | B2 * | 3/2020 | Northrup ............. G06V 30/413 |
| 10,654,166 | B1 | 5/2020 | Hall |
| 10,706,218 | B2 | 7/2020 | Milward et al. |
| 10,706,228 | B2 | 7/2020 | Buisson |
| 10,713,068 | B1 | 7/2020 | Zohar |
| 10,936,807 | B1 | 3/2021 | Walters |
| 11,099,972 | B2 | 8/2021 | Puszkiewicz |
| 11,176,443 | B1 | 11/2021 | Selva |
| 11,182,178 | B1 | 11/2021 | Singh et al. |
| 11,182,604 | B1 | 11/2021 | Methaniya |
| 11,243,803 | B2 | 2/2022 | Anand et al. |
| 11,263,391 | B2 * | 3/2022 | Potts .................... G06F 40/279 |
| 11,348,353 | B2 | 5/2022 | Sundell et al. |
| 11,604,663 | B2 | 3/2023 | Singh et al. |
| 11,614,731 | B2 | 3/2023 | Anand et al. |
| 11,775,321 | B2 | 10/2023 | Singh et al. |
| 11,775,339 | B2 | 10/2023 | Anand et al. |
| 11,775,814 | B1 | 10/2023 | Anand et al. |
| 11,782,734 | B2 | 10/2023 | Ginoya et al. |
| 2002/0029232 | A1 | 3/2002 | Bobrow et al. |
| 2003/0033590 | A1 | 2/2003 | Leherbauer |
| 2003/0101245 | A1 | 5/2003 | Srinivasan et al. |
| 2003/0110382 | A1 | 6/2003 | Leporini |
| 2003/0114959 | A1 | 6/2003 | Sakamoto |
| 2003/0159089 | A1 | 8/2003 | DiJoseph |
| 2004/0083472 | A1 | 4/2004 | Rao et al. |
| 2004/0153649 | A1 | 8/2004 | Rhoads |
| 2004/0172526 | A1 | 9/2004 | Tann et al. |
| 2004/0210885 | A1 | 10/2004 | Wang et al. |
| 2004/0243994 | A1 | 12/2004 | Nasu |
| 2005/0188357 | A1 | 8/2005 | Derks et al. |
| 2005/0204343 | A1 | 9/2005 | Kisamore et al. |
| 2005/0257214 | A1 | 11/2005 | Moshir et al. |
| 2006/0095276 | A1 | 5/2006 | Axelrod et al. |
| 2006/0150188 | A1 | 7/2006 | Roman et al. |
| 2006/0218110 | A1 | 9/2006 | Simske et al. |
| 2007/0030528 | A1 | 2/2007 | Quaeler et al. |

(56) References Cited

U.S. PATENT DOCUMENTS

| | | |
|---|---|---|
| 2007/0089101 A1 | 4/2007 | Romanovskiy |
| 2007/0101291 A1 | 5/2007 | Forstall et al. |
| 2007/0112574 A1 | 5/2007 | Greene |
| 2007/0156677 A1 | 7/2007 | Szabo |
| 2007/0233741 A1 | 10/2007 | Shen |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2008/0301649 A1 | 12/2008 | Stall |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0304295 A1* | 12/2009 | Mori ..................... H04N 1/642 |
| | | 382/302 |
| 2009/0313229 A1 | 12/2009 | Fellenstein et al. |
| 2009/0320002 A1 | 12/2009 | Peri-Glass et al. |
| 2010/0023602 A1 | 1/2010 | Marlone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2011/0022578 A1 | 1/2011 | Folev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0258550 A1 | 10/2011 | Dinh-Trong |
| 2011/0267490 A1 | 11/2011 | Goktekin |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |
| 2012/0310625 A1 | 12/2012 | Wei |
| 2012/0324333 A1 | 12/2012 | Lehavi |
| 2012/0330940 A1 | 12/2012 | Caire et al. |
| 2013/0145006 A1 | 6/2013 | Tammam |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2013/0332511 A1 | 12/2013 | Hala |
| 2013/0332524 A1 | 12/2013 | Fiala |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0189576 A1 | 7/2014 | Carmi |
| 2014/0379666 A1 | 12/2014 | Bryon |
| 2015/0082280 A1 | 3/2015 | Betak et al. |
| 2015/0235193 A1 | 8/2015 | Cummings |
| 2015/0301926 A1 | 10/2015 | Giannelos |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078368 A1 | 3/2016 | Kakhandiki et al. |
| 2017/0270431 A1 | 9/2017 | Hosabettu |
| 2018/0113781 A1 | 4/2018 | Kim |
| 2018/0144042 A1* | 5/2018 | Sheng ..................... G06Q 10/10 |

| | | |
|---|---|---|
| 2018/0176416 A1* | 6/2018 | Ewans .................... G06F 16/93 |
| 2018/0210824 A1 | 7/2018 | Kochura |
| 2018/0218429 A1 | 8/2018 | Guo et al. |
| 2018/0275835 A1 | 9/2018 | Prag |
| 2018/0276462 A1 | 9/2018 | Davis |
| 2018/0321955 A1 | 11/2018 | Liu |
| 2018/0349730 A1 | 12/2018 | Dixon |
| 2018/0370029 A1 | 12/2018 | Hall |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0095440 A1 | 3/2019 | Chakra |
| 2019/0114370 A1 | 4/2019 | Cerino |
| 2019/0126463 A1 | 5/2019 | Purushothaman |
| 2019/0141596 A1 | 5/2019 | Gay |
| 2019/0188462 A1 | 6/2019 | Nishida |
| 2019/0213822 A1 | 7/2019 | Jain |
| 2019/0250891 A1 | 8/2019 | Kumar |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0354720 A1* | 11/2019 | Tucker .................. G06F 40/295 |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1 | 2/2020 | Viet |
| 2020/0097742 A1 | 3/2020 | Kumar et al. |
| 2020/0104350 A1 | 4/2020 | Allen |
| 2020/0147791 A1 | 5/2020 | Safary |
| 2020/0151444 A1 | 5/2020 | Price et al. |
| 2020/0151591 A1 | 5/2020 | Li |
| 2020/0159647 A1 | 5/2020 | Puszkiewicz |
| 2020/0159648 A1 | 5/2020 | Ghare |
| 2020/0249964 A1 | 8/2020 | Fernandes |
| 2020/0257764 A1* | 8/2020 | Reisswig .............. G06F 40/289 |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2021/0042516 A1* | 2/2021 | Panakkal ............. G06V 30/413 |
| 2021/0049128 A1 | 2/2021 | Kernick |
| 2021/0107140 A1 | 4/2021 | Singh |
| 2021/0141497 A1 | 5/2021 | Magureanu |
| 2021/0216334 A1 | 7/2021 | Barrett |
| 2021/0248153 A1* | 8/2021 | Sirangimoorthy .... G06F 16/211 |
| 2021/0279166 A1 | 9/2021 | Peng |
| 2021/0333983 A1 | 10/2021 | Singh et al. |
| 2022/0245936 A1 | 8/2022 | Valk |
| 2022/0405094 A1 | 12/2022 | Farquhar |
| 2023/0052190 A1 | 2/2023 | Goyal et al. |
| 2023/0053260 A1 | 2/2023 | Goyal et al. |
| 2023/0419711 A1* | 12/2023 | Ramnath ............... G06F 40/263 |
| 2025/0078550 A1* | 3/2025 | Duraipandian .. G06V 30/19127 |

OTHER PUBLICATIONS

A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).

Deep Residual Learning for Image Recognition, by K. He, X. Zhang, S. Ren, and J. Sun, arXiv:1512.03385 (2015).

FaceNet: A Unified Embedding for Face Recognition and Clustering, by F. Schroff, D. Kalenichenko, J. Philbin, arXiv:1503.03832 (2015).

Muhammad et al. "Fuzzy multilevel graph embedding", copyright 2012 Elsevier Ltd.

Sharma et al. Determining similarity in histological images using graph-theoretic description and matching methods for content-based image retrieval in medical diagnostics, Biomed Center, copyright 2012.

Reply under 37 CFR 1.111 to Pre-Interview Communication for U.S. Appl. No. 16/779,462, filed Jan. 25, 2022.

(56) References Cited

OTHER PUBLICATIONS

Ren, Shaoqing et al., "Faster r-cnn: Towards realotime object detection with region proposal network." Advances in neutral information processing systems 28 (2015). (Year: 2015).

International Search Report for PCT/US2021/053669, dated May 11, 2022.

Embley et al., "Table-processing paradigms: a research survey", International Journal on Document Analysis and Recognition, vol. 8, No. 2-3, May 9, 2006, pp. 66-86.

Written Opinion for PCT/US2021/053669, dated May 11, 2022.

International Search Report and Written Opinion for PCT/US2022/013026, mailed Sep. 21, 2022.

Al Sallami, Load Balancing in Green Cloud Computation, Proceedings of the World Congress on Engineering 2013 vol. II, WCE 2013, 2013, pp. 1-5 (Year: 2013).

"Ren, Shaoqing et al., Faster r-cnn: Towards real0time object detection with region proposal network." Advances in neutral information processing systems 28 (2015). (Year: 2015).

Zhifang et al., Test automation on mobile device, May 2010, 7 pages.

* cited by examiner

123 Main Street
Suite A
Palo Alto, CA 94304
Phone: 866-555-1212
info@abccompany.com

*Invoice*

Invoice #:134567
Invoice Date: January 1, 2020
Customer ID: ABC001

Bill To:

Automation Anywhere, Inc.
633 River Oaks Parkway
San Jose, CA 95134

Ship To:

Automation Anywhere, Inc.
633 River Oaks Parkway
San Jose, CA 95134

| Date | Your Order # | Our Order # | Sales Rep. | FOB | Ship Via | Terms | Tax ID |
|---|---|---|---|---|---|---|---|
| 01/01/2020 | 10231 | 546293 | Fred | 1/12/2020 | FedEx | Net 30 | 20-234291 |

| Quantity | Item No. | Item Description | Warehouse | Back Order | Unit Price | | Total | |
|---|---|---|---|---|---|---|---|---|
| 10 | 00234 | 16-12 Vinyl Connector | W1 | 0 | 1.20 | 632 | 12.00 | |
| 1 | 00236 | Toggle H Duty DPDT On-Off-On | W1 | 0 | 2.12 | 634 | 2.12 | |
| 1 | 01345 | 12-10 #10 Vinyl Flange Spade | W1 | 0 | 0.56 | 636 | 0.56 | |
| 20 | 54392 | UV Tie Mount 1.1" x 1.1" | W1 | 0 | 4.25 | 638 | 85.00 | |
| 5 | 89205 | DP Connector 60A/3P/240V | W1 | 0 | 1.42 | 640 | 7.10 | |
| 100 | 01582 | Cable Clip #8 SEU | W1 | 0 | 1.00 | 642 | 100.00 | |
| | | | | | | | | |

| | |
|---|---|
| Subtotal | 206.78 |
| Tax | 0.00 |
| Shipping | 0.00 |
| Miscellaneous | 0.00 |
| Balance Due | 206.78 |

FIG. 6E

METHOD AND SYSTEM FOR EXTRACTION OF DATA FROM DOCUMENTS FOR ROBOTIC PROCESS AUTOMATION

CROSS-REFERENCE TO RELATED APPLICATIONS

This application claims priority to: (i) U.S. Patent Provisional Application No. 63/087,851, filed Oct. 5, 2020, and entitled "METHOD AND SYSTEM FOR EXTRACTION OF DATA FROM DOCUMENTS FOR ROBOTIC PRO-CESS AUTOMATION," which is hereby incorporated herein by reference; (ii) U.S. Patent Provisional Application No. 63/087,844, filed Oct. 5, 2020, and entitled "METHOD AND SYSTEM FOR EXTRACTION OF TABLE DATA FROM DOCUMENTS FOR ROBOTIC PROCESS AUTO-MATION," which is hereby incorporated herein by refer-ence; and (iii) U.S. Patent Provisional Application No. 63/087,847, filed Oct. 5, 2020, and entitled "MACHINED LEARNING SUPPORTING DOCUMENT DATA EXTRACTION," which is hereby incorporated herein by reference.

This application is related to: (i) U.S. patent application Ser. No. 17/160,082, filed Jan. 27, 2021, and entitled "MACHINED LEARNING SUPPORTING DOCUMENT DATA EXTRACTION," which is hereby incorporated herein by reference; and (ii) U.S. patent application Ser. No. 17/160,084, filed Jan. 27, 2021, and entitled "METHOD AND SYSTEM FOR EXTRACTION OF TABLE DATA FROM DOCUMENTS FOR ROBOTIC PROCESS AUTO-MATION," which is hereby incorporated herein by refer-ence.

BACKGROUND OF THE INVENTION

Robotic Process Automation (RPA) systems enable auto-mation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. There-fore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

In the case of documents that are to be accessed and processed by one or more software applications being used by software agents, the documents can be analyzed from images of the documents. The document image can contain text which can be obtained by Optical Character Recogni-tion (OCR) processing. While OCR processing of docu-ments can recognize text contained therein, such process is not well suited to capture data from tables contained in the documents, such as invoices, purchase orders, or more generally tables, nor is such process well suited to capture values and associated descriptive labels contained in the documents.

Therefore, there is a need for improved approaches to understand and extract data provided within documents such that RPA systems are able to accurately understand the content of the documents so that software robots can operate on the documents with increased reliability and flexibility.

SUMMARY

Embodiments disclosed herein can provide for extraction of data from documents, namely, images of documents. The extraction processing can be hierarchical, such as being performed in multiple levels (i.e., multi-leveled). At an upper level, numerous different objects within a document can be detected along with positional data for the objects and can be categorized based on a type of object. Then, at lower levels, the different objects can be processed differently depending on the type of object. As a result, data extraction from the document can be performed with greater reliability and precision.

Embodiments disclosed herein can concern improved techniques to access content from documents in an auto-mated fashion. The improved techniques permit content within documents to be retrieved and then used by computer systems operating various software programs (e.g., applica-tion programs), such as an extraction program. Documents, especially business transaction documents, often have (i) tables containing content and/or (ii) various descriptors and values that form key-value pairs. The improved techniques permit key-value pairs within documents to be recognized and extracted from documents. As an example, a document can represent key-value pairs in one or more tables. Through use of the improved techniques, RPA systems are able to accurately understand the content within documents, namely, key-value pairs or tables therein, so that users and/or software robots can operate on the documents with increased reliability and flexibility. The documents being received and processed can be electronic images of documents. As an example, the documents can be business transaction docu-ments which include one or more tables and/or key-value pairs such as for date, quantity, price, part number, account number, etc. Consequently, RPA systems are able to accu-rately understand the content within documents so that users, application programs and/or software robots can oper-ate on the documents with increased reliability and flexibil-ity. The documents being received and processed can be electronic images of documents.

The invention can be implemented in numerous ways, including as a method, system, device, apparatus (including computer readable medium and graphical user interface). Several embodiments of the invention are discussed below.

As a document extraction system for extracting content from documents, one embodiment can, for example, include at least: an object detection component that receives a document image for a document to be processed, determines a plurality of object blocks of the document, and outputs a plurality of object blocks, each of the object blocks having a block type that denotes a type of object block; a plurality of data extraction components, each of the data extraction components being associated with extraction of data from object blocks with different block types; and an object classifier operatively connected to the object detection com-ponent, the object classifier configured to direct different ones of the object blocks of the document to different ones of the data extraction components based on at least the block type corresponding to the different ones of the object blocks.

As a system for robotic process automation, one embodi-ment can include at least a document extraction sub-system for extracting content from documents. The document extraction sub-system can, for example, include at least: an object detection component that receives a document image for a document to be processed, detects a plurality of object blocks within the document, and outputs a plurality of object blocks, each of the object blocks having a block type that denotes a type of object block; a plurality of data extraction components, each of the data extraction components being associated with extraction of data from object blocks with different block types; and an object classifier operatively connected to the object detection component, the object classifier configured to direct different ones of the object blocks of the document to different ones of the data extraction components based on at least the block type corresponding to the different ones of the object blocks.

As a computer-implemented method for extracting content from documents, one embodiment can, for example, include at least: receiving a document to be processed, the document being received as a digital image; determining objects in the document, each of the detected objects being denoted by an object type; determining data extraction processing to be perform for a given one of each of the detected objects based on the object type associated therewith; and performing the determined data extraction on the detected objects as determined based on the object type, wherein the detected objects that have different object types are processed differently.

As a non-transitory computer readable medium including computer program code tangibly stored therein for extracting content from documents, one embodiment can, for example, include at least: computer program code for receiving a document to be processed, the document being received as a digital image; computer program code for determining objects in the document, each of the detected objects being denoted by an object type; computer program code for determining data extraction processing to be perform for a given one of each of the detected objects based on the object type associated therewith; and computer program code for performing the determined data extraction on the detected objects as determined based on the object type, wherein the detected objects that have different object types are processed differently.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIGS. 6A-6G illustrate an exemplary document during various phases of data extraction from a table within the exemplary document, according to at least one embodiment.

DETAILED DESCRIPTION OF CERTAIN EMBODIMENTS

Figure 1:
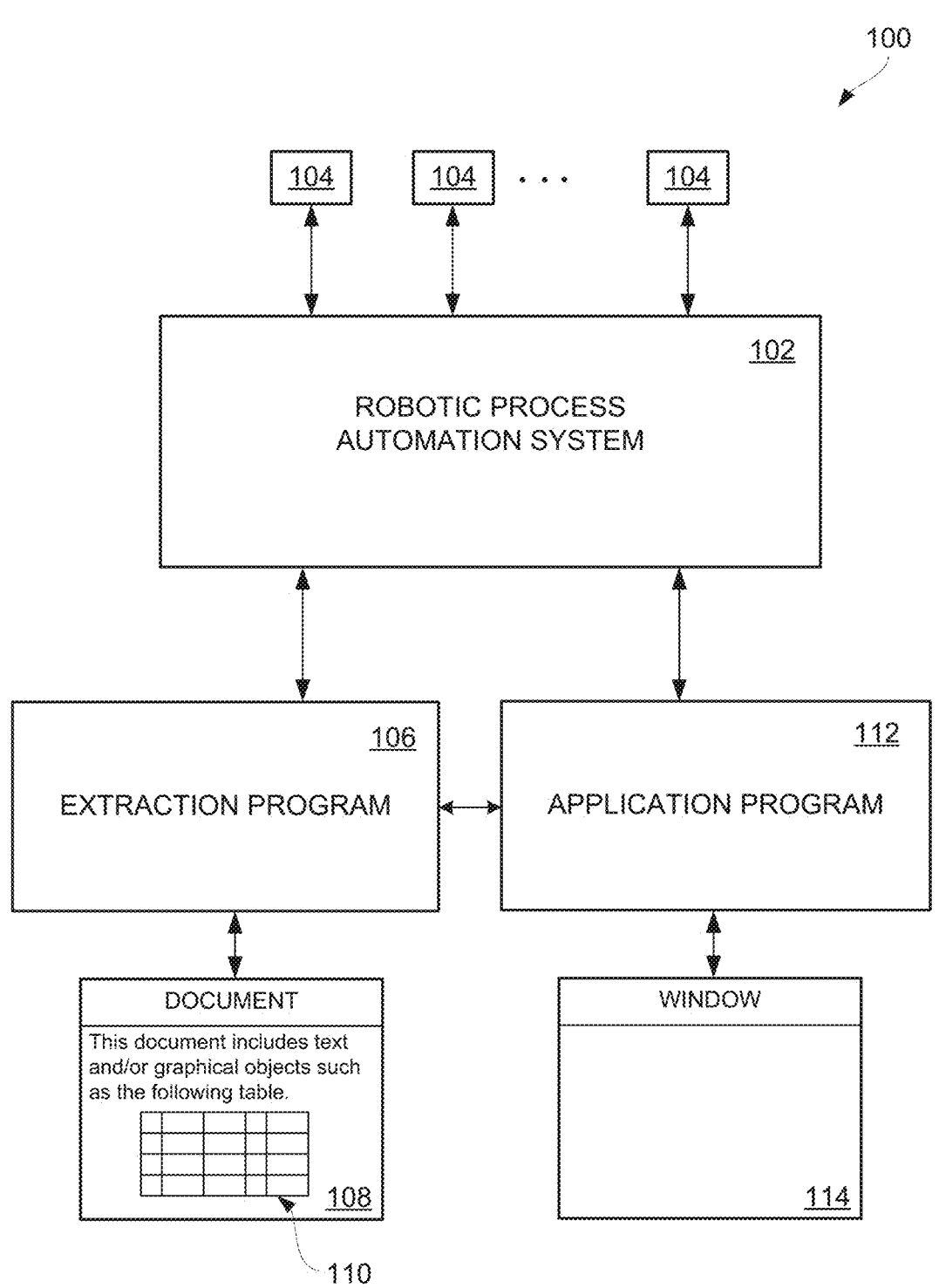
FIG. 1 is a block diagram of a programmatic automation environment according to one embodiment.

Embodiments disclosed herein can provide for extraction of data from documents, namely, images of documents. The extraction processing can be hierarchical, such as being performed in multiple levels (i.e., multi-leveled). At an upper level, numerous different objects within a document can be detected along with positional data for the objects and can be categorized based on a type of object. Then, at lower levels, the different objects can be processed differently depending on the type of object. As a result, data extraction from the document can be performed with greater reliability and precision.

Embodiments disclosed herein can concern improved techniques to access content from documents in an automated fashion. The improved techniques permit content within documents to be retrieved and then used by computer systems operating various software programs (e.g., application programs), such as an extraction program. Documents, especially business transaction documents, often have (i) tables containing content and/or (ii) various descriptors and values that form key-value pairs. The improved techniques permit key-value pairs within documents to be recognized and extracted from documents. As an example, a document can represent key-value pairs in one or more tables. Through use of the improved techniques, RPA systems are able to accurately understand the content within documents, namely, key-value pairs or tables therein, so that users and/or software robots can operate on the documents with increased reliability and flexibility. The documents being received and processed can be electronic images of documents. As an example, the documents can be business transaction documents which include one or more tables and/or key-value pairs such as for date, quantity, price, part number, account number, etc. Some examples of business transaction documents which normally include key-values pairs are purchase orders, invoices, delivery receipts, bills of lading, etc. Consequently, RPA systems are able to accurately understand the content within documents so that users, application programs and/or software robots can operate on the documents with increased reliability and flexibility. The documents being received and processed can be electronic images of documents.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software automation processes. The RPA systems can provide for creation, configuration, management, execution, monitoring, and performance of software automation processes.

A software automation process can also be referred to as a software robot, software agent, or a bot. A software automation process can interpret and execute tasks on your behalf. Software automation processes are particularly well suited for handling a lot of the repetitive tasks that humans perform every day. Software automation processes can perform a task or workflow that they are tasked with once or many times. As one example, a software automation process can locate and read data in a document, email, file, or other data source. As another example, a software automation process can connect with one or more Enterprise Resource Planning (ERP), Customer Relations Management (CRM), core banking, or other business systems to distribute data where it needs to be in whatever format is necessary. As another example, a software automation process can perform data tasks, such as reformatting, extracting, balancing, error checking, moving, copying, etc. As another example, a software automation process can retrieve data from a webpage, application, screen, or window. As still another example, a software automation process can be trigger based on time or an event, and can serve to take files or data sets and move them to another location, whether it is to a customer, vendor, application, department or storage. These various capabilities can also be used in any combination. As an example of an integrated software automation process, the software automation process can start a task or workflow based on a trigger, such as a file being uploaded to an FTP system. The integrated software automation process can then download that file, scrape relevant data from it, upload the relevant data to a database, and then send an email to inform the recipient that the data has been successfully processed.

Embodiments of various aspects of the invention are discussed below with reference to FIGS. 1-11. However, those skilled in the art will readily appreciate that the detailed description given herein with respect to these figures is for explanatory purposes as the invention extends beyond these limited embodiments.

FIG. 1 is a block diagram of a programmatic automation environment 100 according to one embodiment. The programmatic automation environment 100 is a computing environment that supports robotic process automation. The computing environment can include or make use of one or more computing devices. Each of the computing devices can, for example, an electronic device having computing capabilities, such as a mobile phone (e.g., smart phone), tablet computer, desktop computer, portable computer, server computer, and the like.

The programmatic automation environment 100 includes a robotic process automation system 102 that provides robotic process automation. The robotic process automation system 102 supports a plurality of different robotic processes, which are denoted software automation processes 104. These software automation processes 104 can also be referred to as "software robots," "bots" or "software bots." The robotic process automation system 102 can create, maintain, execute, and/or monitor software automation processes 104. The robotic process automation system 102 can also report status or results of software automation processes 104.

On execution of one or more of the software automation processes 104, the software automation processes 104, via robotic process automation system 102, can interact with one or more software programs. One such software program is an extraction program 106. The extraction program 106, when operating, typically interacts with one or more documents 108. In some cases, the extraction program 106 is seeking to access documents 108 that contain data that is to be extracted and then suitably processed. The documents 108 are typically digital images of documents, and such documents can include text and graphical objects, such one or more tables. The RPA system 102 can include sophisticated processing and structures to support the extraction of data from such document images, and in particular extraction of data from tables within the documents. Examples of documents 108 including tables are invoices, purchase orders, delivery receipts, bill of lading, etc.

When robotic process automation operations are being performed, the robotic process automation system 102 seeks to interact with the extraction program 106. However, since the robotic process automation system 102 is not integrated with the extraction program 106, the robotic process automation system 102 requires an ability to understand what content is contained in the document 108. For example, the content being presented in the extraction window 108 can pertain to a document, which can include a table 110 within the document. In this regard, the robotic process automation system 102 interacts with the extraction program 106 by interacting with the content in the document 108. By doing so, the software automation process 104 being carried out via the robotic process automation system 102 can effectively interface with the document 108 as would a user, even though no user is involved because the actions by the software automation process 104 are programmatically performed. Once the content of the document is captured and understood, the robotic process automation system 102 can perform an action requested by the software automation process 104 by inducing action with respect to the application program 106.

When robotic process automation operations are being performed, the robotic process automation system 102 seeks to interact with the application program 112. However, since the robotic process automation system 102 is not integrated with the application program 112, the robotic process automation system 102 requires an ability to understand what content is being presented in the application window 114. For example, the content being presented in the application window 114 can pertain to a document, which can include a table 110 within the document 108. In this regard, the robotic process automation system 102 interacts with the application program 112 by interacting with the content in the application window 114 corresponding to the application program 112. The content can pertain to a document being displayed in the application window. By doing so, the software automation process 104 being carried out via the robotic process automation system 102 can effectively interface with the document being displayed in the application window 114 as would a user, even though no user is involved because the actions by the software automation process 104 are programmatically performed.

In one embodiment, the application program 112 can host the extraction program 106. In such case, the robotics process automation system 102 can interact with the application program 112 to carry out the software automation process 104, and the application program 112 can interact with the extraction program 106 as needed.

Figure 2:
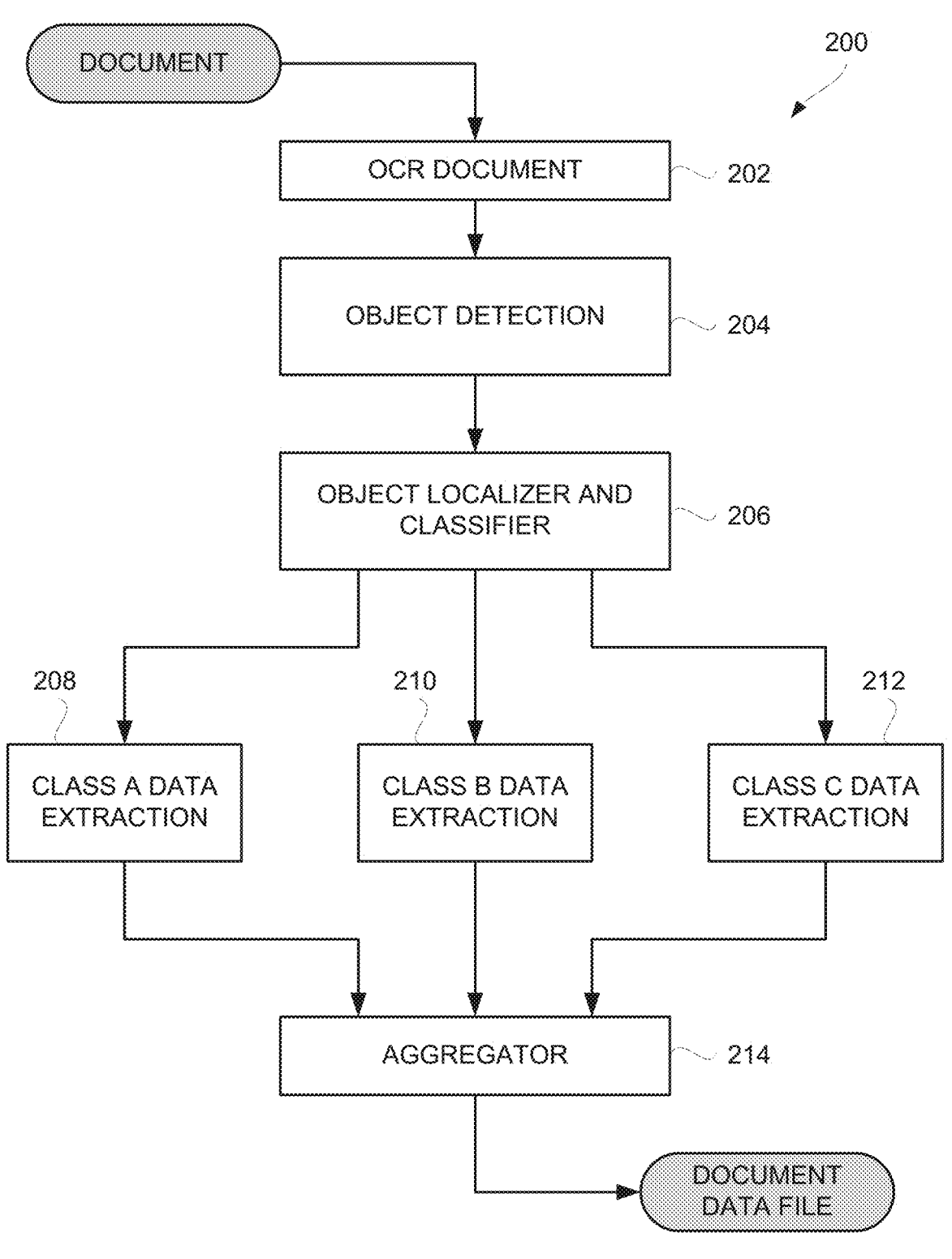
FIG. 2 is a block diagram of data extraction system according to one embodiment.

FIG. 2 is a block diagram of data extraction system 200 according to one embodiment. The data extraction system 200 receives a document to be processed. The document to be processed is an electronic document, such as an image (PNG, JPEG, etc.) or Portable Document Format (PDF). The document can then be processed to recognize the text within the document such as through use of Optical Character Recognition (OCR) 202. Next, the document can undergo object detection 204. The object detection 204 serves to identify various objects within the document as well as identifying the different classes or types of those objects that have been identified within the document. An object localizer and classifier 206 can then be used to further process the identified objects depending upon their classification (or type).

In this particular embodiment illustrated in FIG. 2, the object localizer and classifier 206 serves to classify the detected objects into three distinct classes, that is, class A, class B and class C. The detected objects that are classified as class A objects are directed by the object localizer and classifier 206 to class A data extraction 208 where data can be extracted from the class A objects. The detected objects that are classified as class B objects can be directed by the object localizer and classifier 206 to class B data extraction 210 where data can be extracted from the class B objects. The detected objects that are classified as class C objects can be directed by the object localizer and classifier 206 to class C data extraction 212 where data can be extracted from the class C objects. In this regard, different data extraction processing can be provided for different types of objects. As a result, more robust and efficient data extraction is able to be provided separately for different type of objects.

Additionally, the data extraction system 200 includes an aggregator 214. The aggregator 214 is coupled to the class A data extraction 208, the class B data extraction 210 and the class C data extraction 212 such that the extracted data from the various objects (or blocks) of the document can be aggregated together to form a document data file that is produced by the data extraction system 200 and contains all the extracted data for the document.

The classes used by the object localizer and classifier 206 can vary with implementation. These classes are also referred to as blocks or object blocks. Some exemplary classes for documents include the following: key-value block, key info block, table block, graphic block, etc.

Figure 3A:
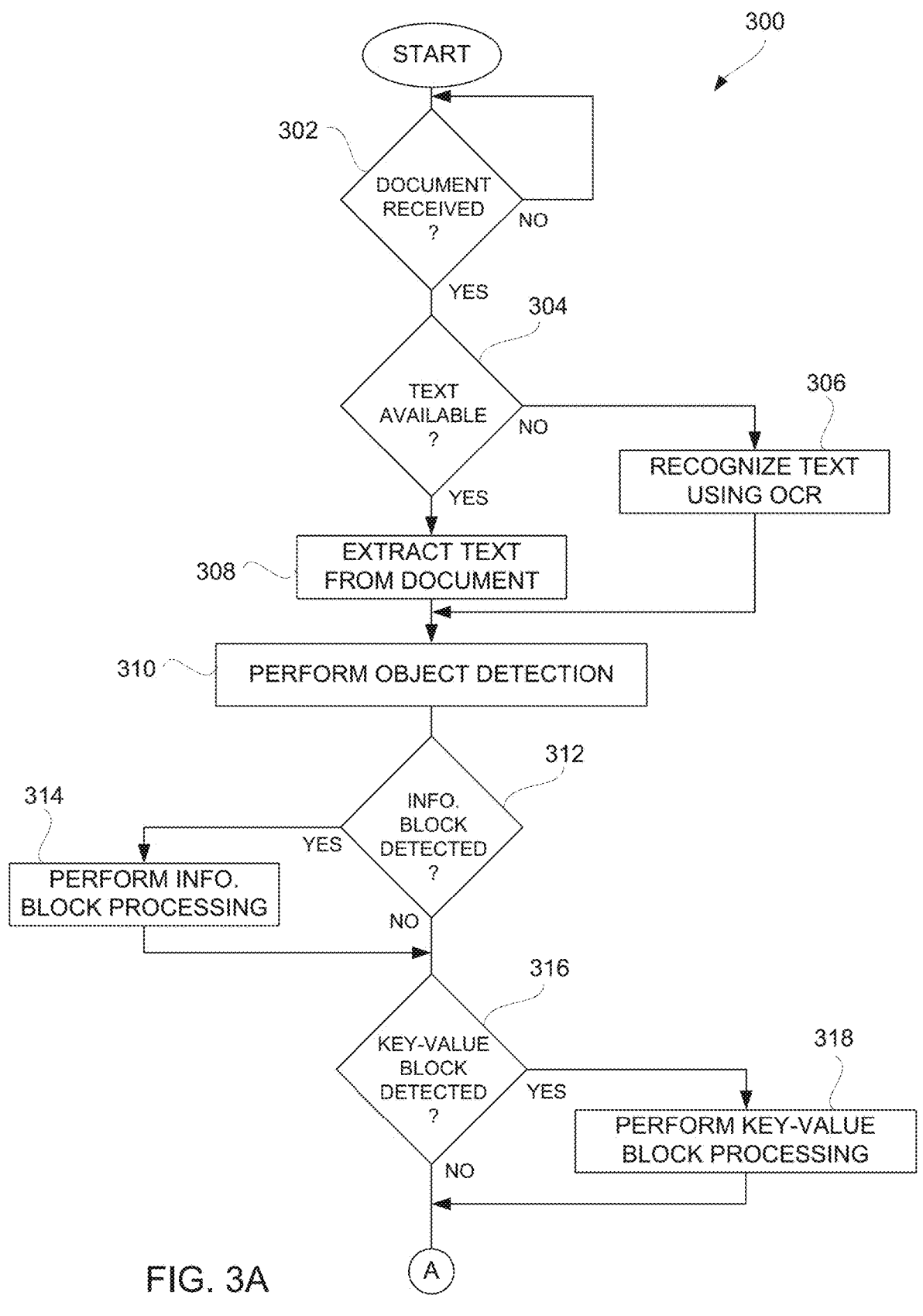
FIGS. 3A and 3B are flow diagrams of a data extraction process according to one embodiment.
Figure 3B:
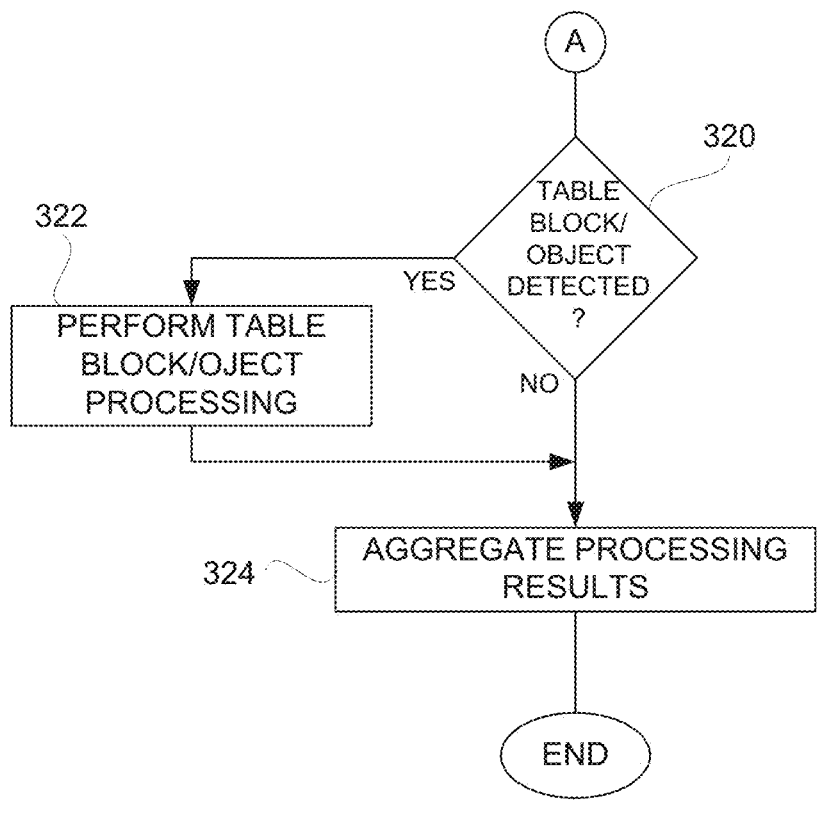

FIGS. 3A and 3B are flow diagrams of a data extraction process 300 according to one embodiment. The data extraction process 300 can, for example, be performed by an extraction program, such as the extraction program 106.

The data extraction process 300 can begin with a decision 302 that determines whether a document has been received. When the decision 302 determines that a document has not yet been received, the data extraction process 300 can await receipt of such a document. Once the decision 302 determines that a document has been received, a decision 304 can determine whether text is available from the document. For example, if the document is provided as an image, then the text would not be directly available. On the other hand, if the document is a vector-based PDF document, the text would normally be available. When the decision 304 determines that text is available from the document, then the text is extracted 308 from the document. Alternatively, when the decision 304 determines that text is not available from the document, the text within the document can be recognized 306 using OCR. When the decision 304 determines that text is not available from the document, the text within the document can be recognized 306 using OCR. Alternatively, when the decision 304 determines that text is available from the document, then the text is extracted 308 from the document.

Following block 308 or block 306 after the text within the document has been obtained, object detection can be performed 310. The object detection seeks to detect these one or more objects within the document. In this embodiment, the objects that can be detected include an information block, a key-value block, and a table block. However, the invention is not limited to detection of these particular types of objects.

After the object detection has been performed, a decision 312 can determine whether an information block has been detected within the document. When the decision 312 determines that an information block has been detected, then information block processing can be performed 314. After the information block processing has been performed 314, or directly after the decision 312 when no information block has been detected, a decision 316 can determine whether a key-value block has been detected. When the decision 316 determines that a key-value block has been detected, key-value block processing can be performed 318. After the key-value block processing has been performed 318, or directly following the decision 316 when a key-value block is not been detected, a decision 320 can determine whether a table block/object has been detected. When the decision 320 determines that a table block/object has been detected, table block/object processing can be performed 322. Here, when the document includes a table, there is a table block and associated table objects. The table block/object processing can process these components of the table. After the table block/object processing has been performed 322, or directly following the decision 320 when the table block/object is not been detected, the data extraction process can aggregate 324 processing results. Here, to the extent that the object detection has detected one or more information blocks, key-value blocks and/or table blocks/objects, the results from the processing thereof can be aggregated 324. The result of the aggregation 324 can be provided in a document data file. Following the aggregation 324, the data within the table provided in the document has been extracted and thus the data extraction and process 300 can end.

Figure 4A:
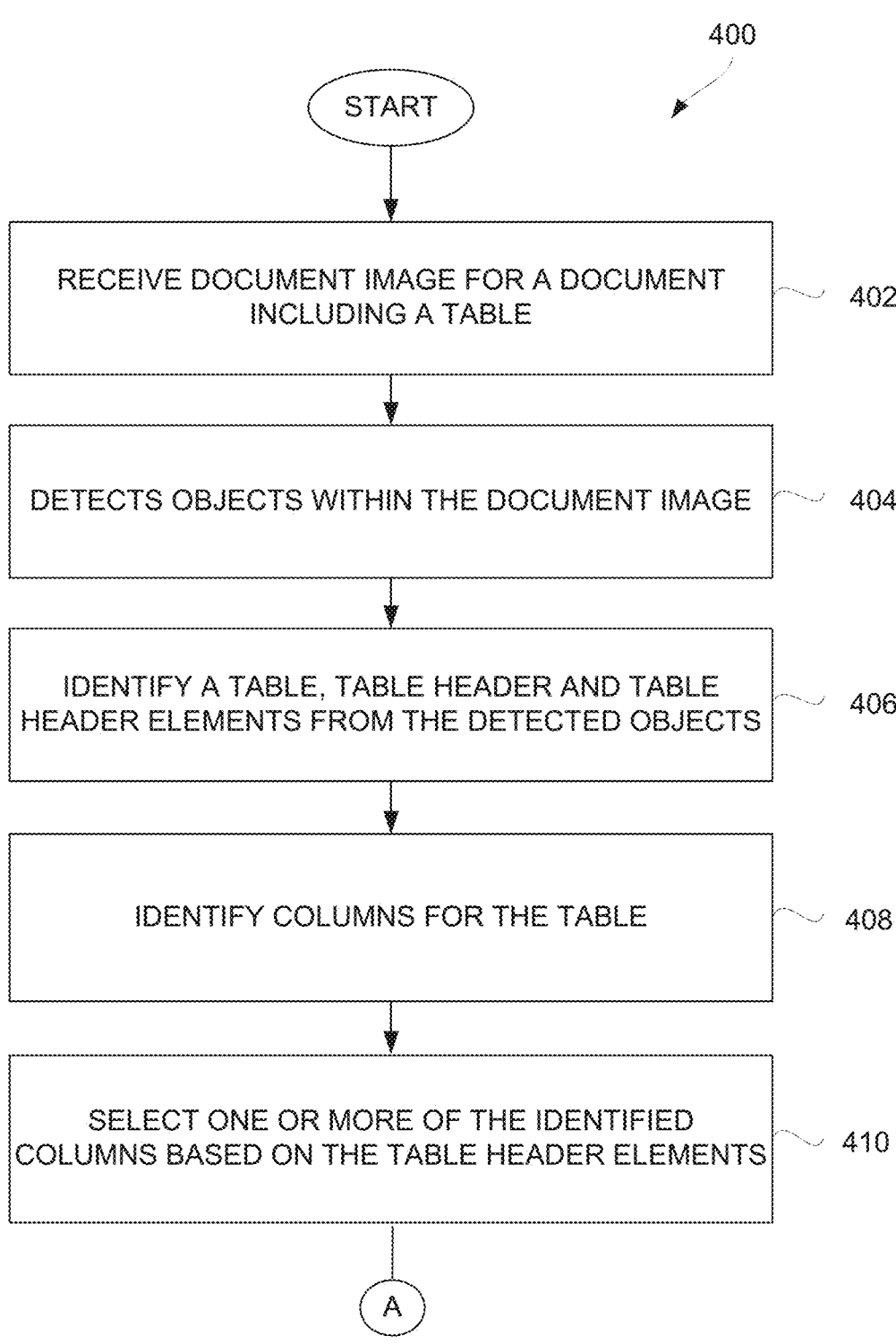
FIGS. 4A and 4B are flow diagrams of a table data extraction process according to another embodiment.
Figure 4B:
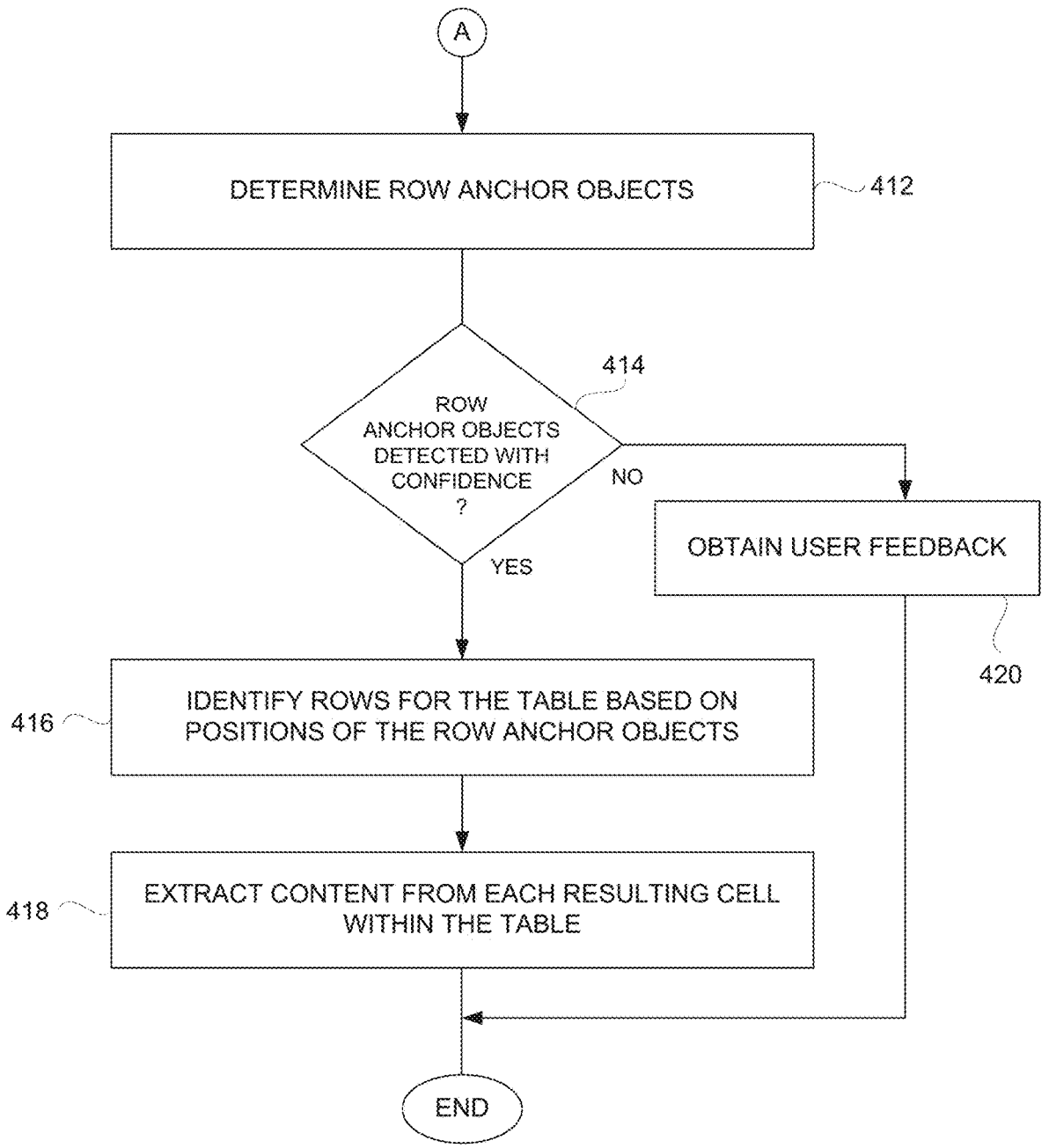

FIGS. 4A and 4B are flow diagrams of a table data extraction process 400 according to another embodiment. The table data extraction process 400 can, for example, be performed by an extraction program, such as the extraction program 106 illustrated in FIG. 1.

The table data extraction process 400 receives 402 into a document image for a document that includes a table. Next, the document image can be processed to detect 404 objects within the document image. After the objects have been detected 404, a table, a table header and table header elements can be identified 406 from the detected objects. Next, columns for the table can be identified 408 using at least one or more of the objects that have been detected 404.

Thereafter, one or more of the identified columns can be selected 410 based on the table header elements. Next, row anchor objects can be determined 412. Row anchor objects are typically text, such as words or labels, or values that can be used to signal location of rows of the table. Then, a decision 414 can determine whether row anchor objects have been detected with confidence. When the decision 414 determines that row anchor objects have been detected with confidence, rows for the table can be identified 416 based on positions of the row anchor objects. Then, content can be extracted 418 from each resulting cell within the table. The cells are defined by the intersection of columns and rows. Following the block 418, since the columns and rows of the table were detected and content from its resulting cells has been extracted, the table data extraction process 400 can end. Alternatively, if the decision 414 determines that the row anchor objects have not been detected with confidence, the user feedback can be obtained 420 to assist with extraction of content from the table within the document.

FIG. 5A-5D are flow diagrams of a table data extraction process 500 according to still another embodiment. The table data extraction process 500 can, for example, be performed by an extraction program, such as the extraction program 106 illustrated in FIG. 1.

The table data extraction process 500 receives 502 into a document image for a document that includes a table. Next, the document image can be processed to detect 504 objects within the document image. After the objects have been detected 504, a table, a table header and table header elements can be identified 506 from the detected objects. Next, columns for the table can be identified 508 using at least one or more of the objects that have been detected 504.

Thereafter, one or more of the identified columns can be selected 510 based on the table header elements. Next, a decision 512 determines whether the selected table header element is approximately pertaining to a quantity. Here, the selected table header element can be "quantity" or an alias therefor, such as "amount." When the decision 512 determines that the selected table header element is corresponding to a quantity, then word blocks in the column associated with the quantity column can be identified 514. Next, rows for the table can be identified 516 based on positions of the identified word blocks. After the rows for the table have been identified 516, the table data extraction process 500 can proceed to extract 518 content from each resulting cell within the table. The cells of the table are defined by the intersection of columns and rows.

Figure 5A:
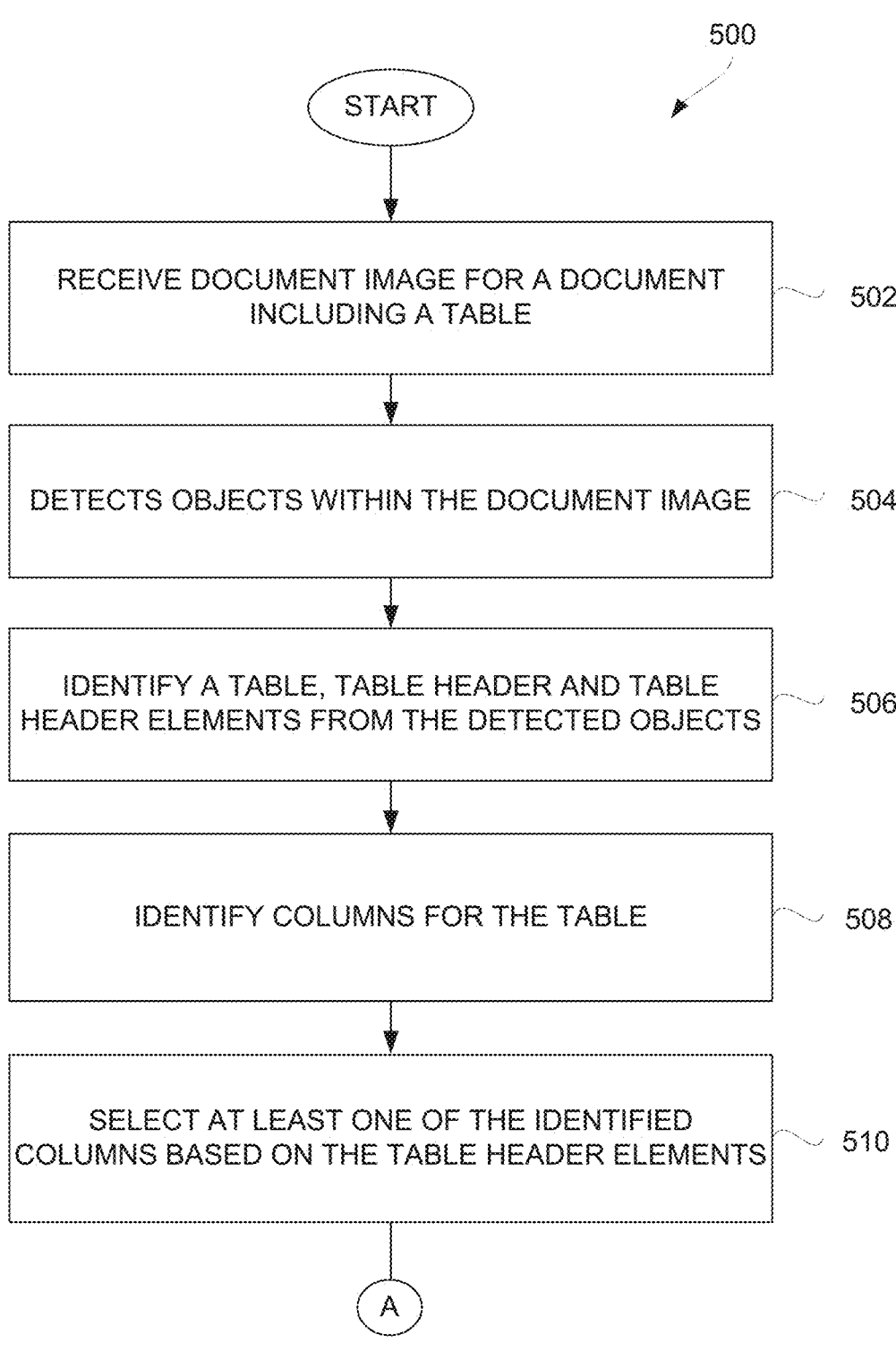
FIG. 5A-5D are flow diagrams of a table data extraction process according to still another embodiment.
Figure 5B:
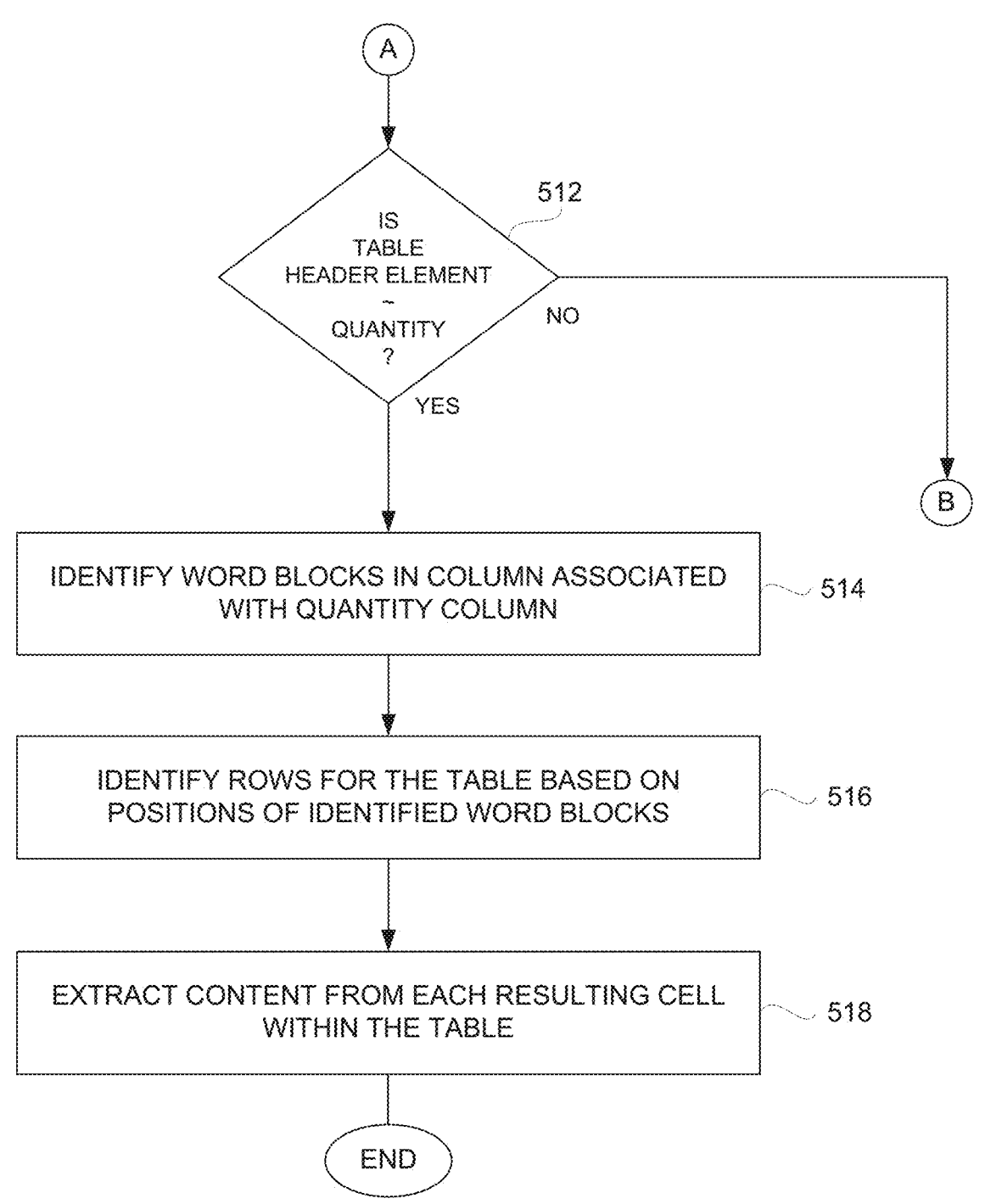
Figure 5C:
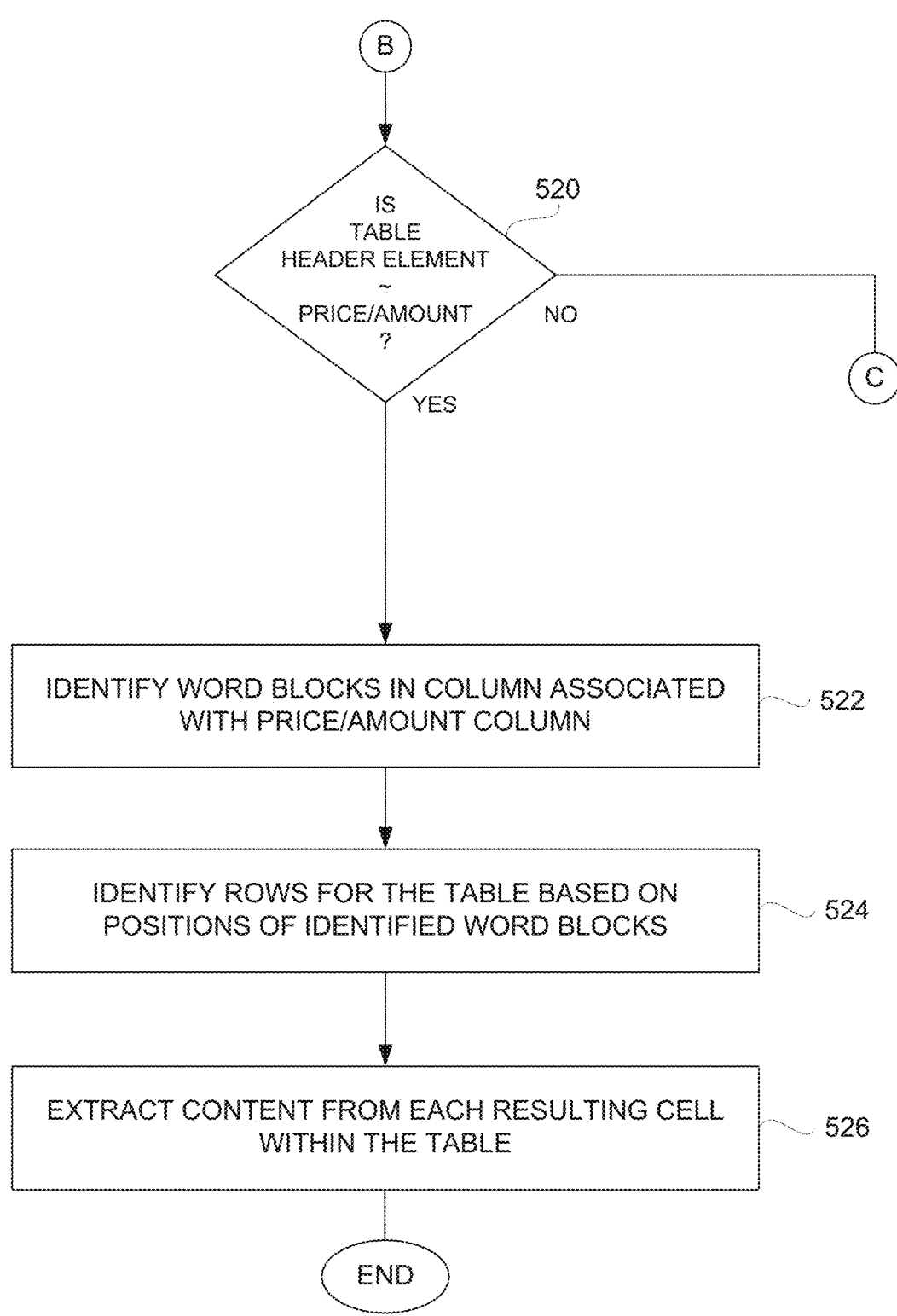

On the other hand, when the decision 512 determines that the selected table header element does not correspond to quantity, then the table data extraction process 500 can perform other processing, such as shown in FIG. 5C. The other processing can proceed with a decision 520 that determines whether the selected table header element corresponds to a price or amount. Here, the selected table header element can be "price" or amount" or an alias therefor, such as "total." When the decision 520 determines that the selected table header element does correspond to a price or amount, then word blocks in the column associated with the price/amount column can be identified 522. Then, rows for the table can be identified 524 based on positions of the identified word blocks. After the rows for the table have been identified 524, the table data extraction process 500 can proceed to extract 526 content from each resulting cell within the table.

Figure 5D:
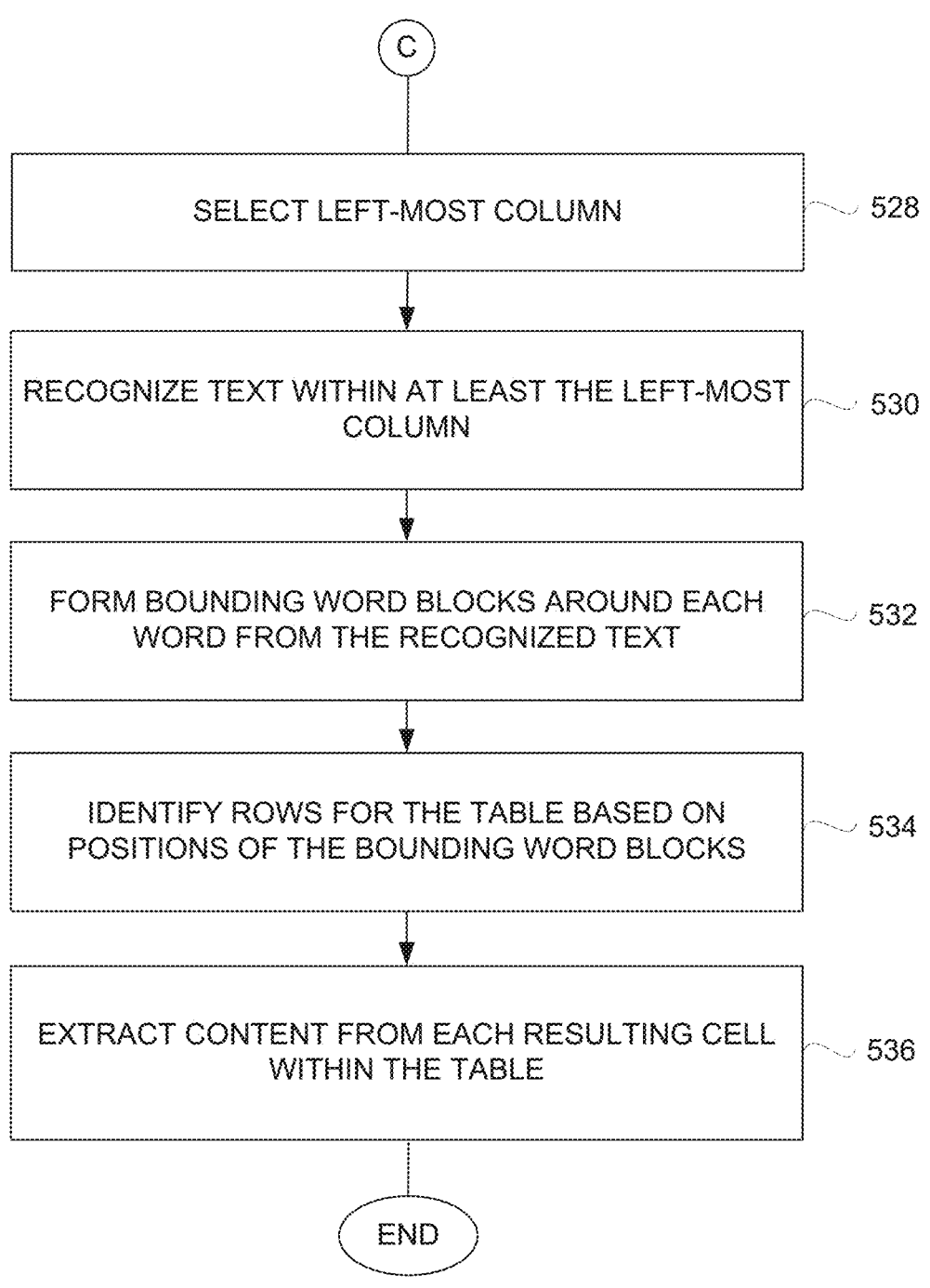

On the other hand, when the decision 520 determines that the selected table header element does not correspond to price or amount, then the table data extraction process 500 can perform other processing, such as shown in FIG. 5D. The other processing can proceed by selection 528 of a left-most column from the columns identified within the table. Then, the table data extraction process 500 can recognize 530 text within the left-most column. Thereafter, bounding word blocks can be formed 532 around each word from the recognized text. Rows for the table can then be identified 534 based on positions of the bounding word blocks. Finally, content from each resulting cell within the table can be extracted 536. Following the block 536, the table data extraction process 500 can end.

FIGS. 6A-6G illustrate an exemplary document during various phases of data extraction from a table within the exemplary document, according to one or more embodiment.

Figure 6A:
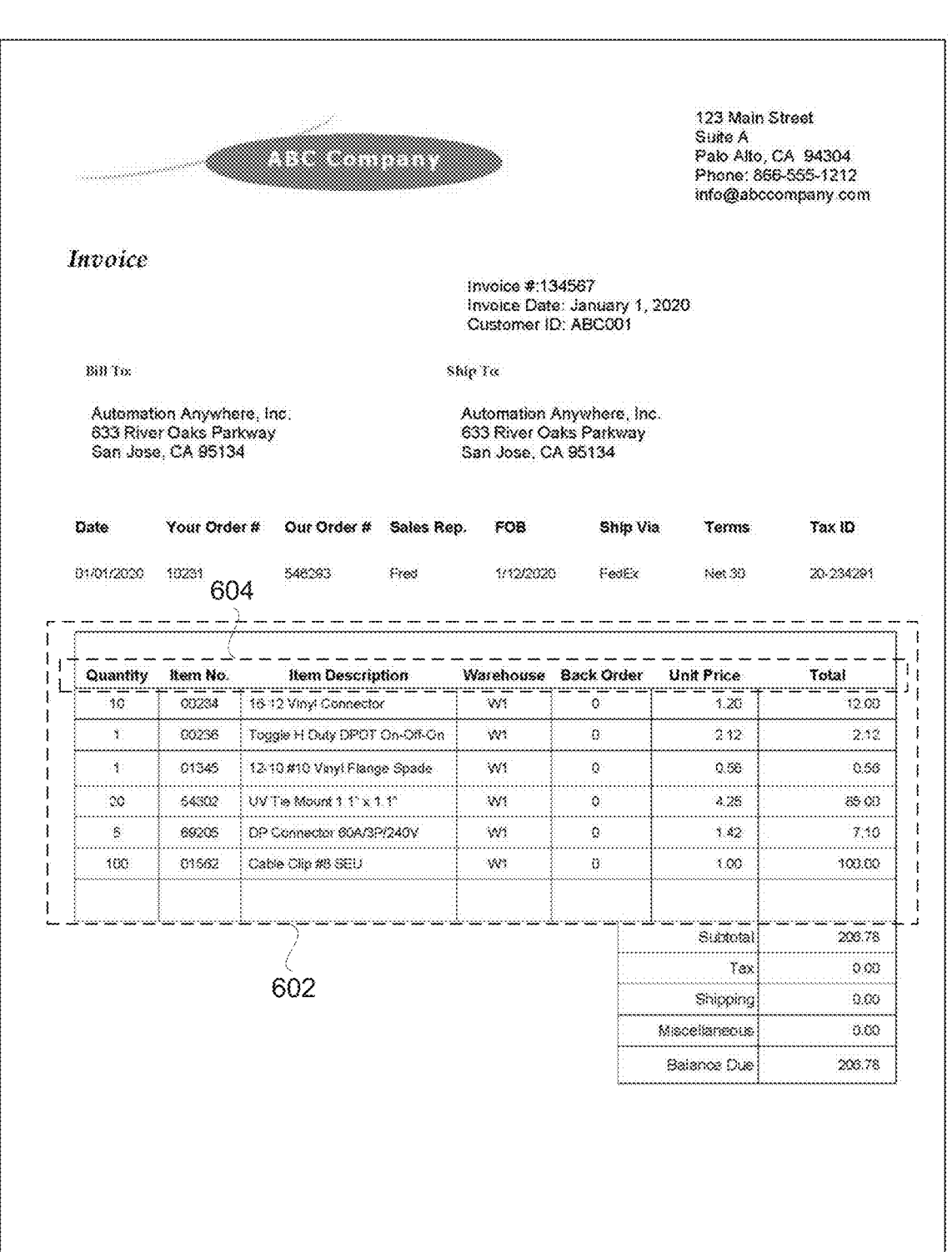

FIG. 6A illustrates the exemplary document after object detection. Here, the object detection is provided for the portion of the document having a table. The detected objects include detection of the table and its table header. Each of the table and the table header are denoted in the exemplary document by a bounding box surrounding the same. The detected table is denoted by a table bounding box 602. The detected table header is denoted by a table header bounding box 604.

Figure 6B:
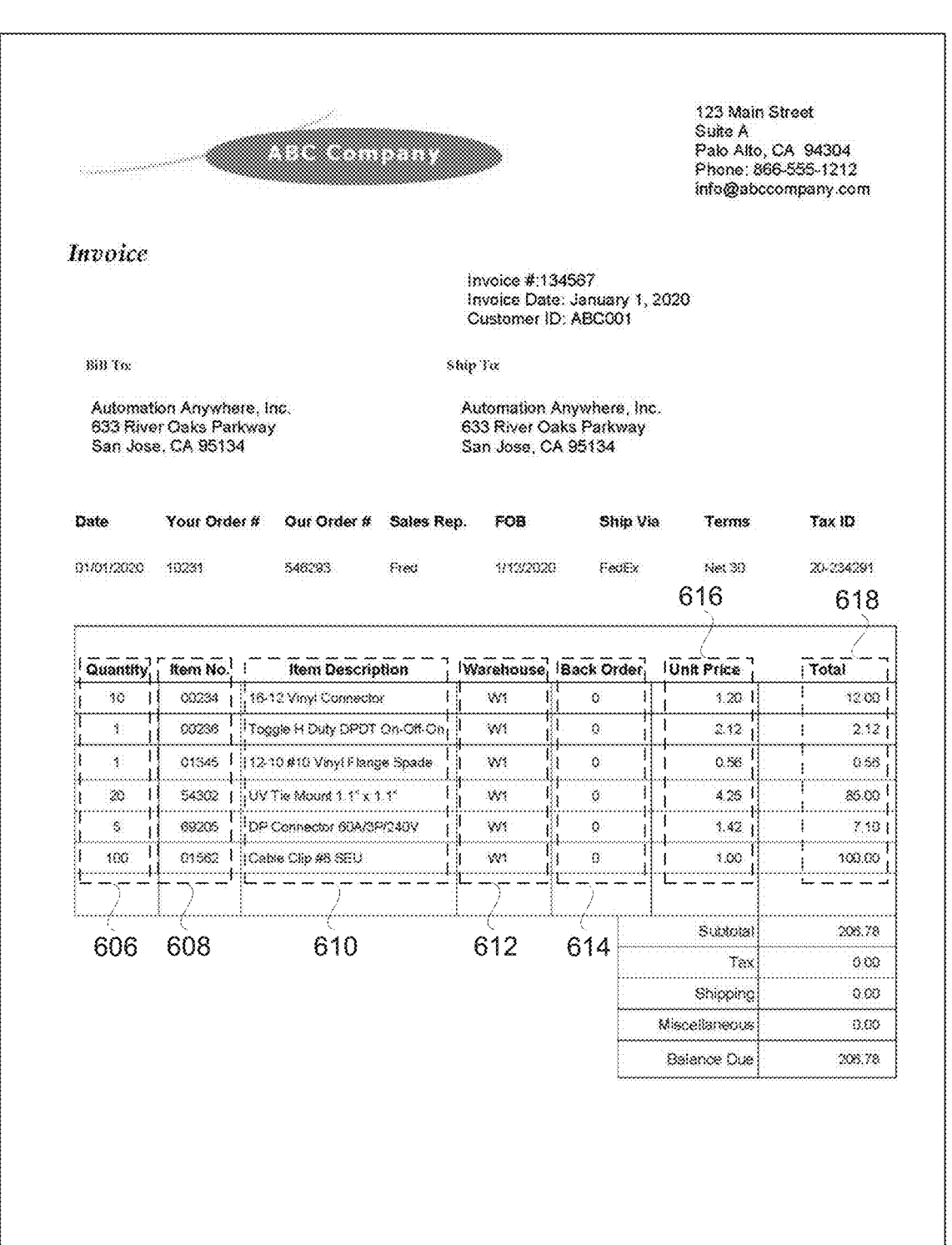

FIG. 6B illustrates the exemplary document after table header elements and columns have been identified. Each of the header elements are denoted in the exemplary document by a bounding box surrounding the corresponding header element. Each of the columns are denoted in the exemplary document by a bounding box surrounding the corresponding column. As illustrated in FIG. 6B, for a given column, the bounding box can surround not only the corresponding header element but also the corresponding column. For example, as illustrated in FIG. 6B, a first recognized column has a first header element "Quantity" and column entries "10", "1", "1", "20", "5", and "100". A bounding box 606 surrounds the first header element and the first recognized column.

A second recognized column has a second header element "Item No." and column entries "00234", "00236", "01345", "54302", "69205", and "01562". A bounding box 608 surrounds the second header element and the second recognized column.

A third recognized column has a third header element "Item Description" and column entries "16-12 Vinyl Connector", "Toggle H Duty DPDT On-Off-On", "12-10 #10 Vinyl Flange Spade", "UV Tie Mount 1.1"×1.1"", "DP Connector 60A/3P/240V", and "Cable Clip #8 SEU". A bounding box 610 surrounds the third header element and the third recognized column.

A fourth recognized column has a fourth header element "Warehouse" and column entries "W1", "W1", "W1", "W1", "W1", and "W1". A bounding box 612 surrounds the fourth header element and the fourth recognized column.

A fifth recognized column has a fifth header element "Backorder" and column entries "0", "0", "0", "0", "0", and "0". A bounding box 614 surrounds the fifth header element and the fifth recognized column.

A sixth recognized column has a sixth header element "Unit Price" and column entries "1.20", "2.12", "0.56", "4.25", and "1.42", and "1.00". A bounding box 616 surrounds the sixth header element and the sixth recognized column.

A seventh recognized column has a seventh header element "Total" and column entries "12.00", "2.12", "0.56", "85.00", "7.10", and "100.00". A bounding box 618 surrounds the seventh header element and the seventh recognized column.

Figure 6C:

FIG. 6C illustrates the exemplary document after columns that have table header elements that match an alias type have been identified. Such table header elements can be used to identify columns that can be used as denoting a row anchor pattern. That is, the elements within such a column can signal the position of the rows of the table. In this example, the columns have been identified are the first column denoted by the bounding box 606, the sixth column denoted by the bounding box 616, and the seventh column denoted by the bounding box 618. The first column has a table header element of "Quantity", the sixth column has a table header element "Unit Price", and the seventh column has a table header element "Total". These columns are suitable for selection for use in determining the rows within the table.

Figure 6D:
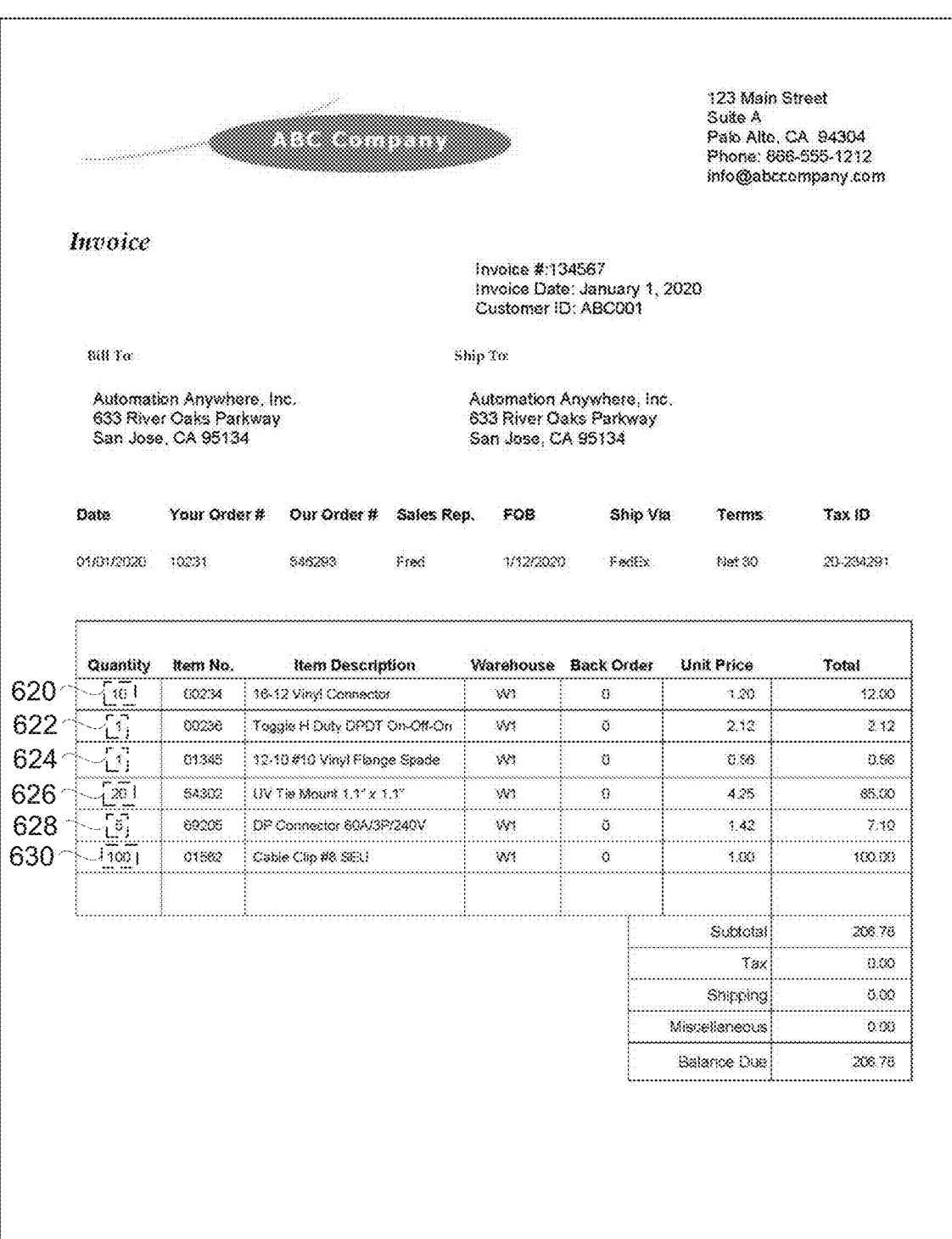

FIG. 6D illustrates the exemplary document after the first column (surrounded by the bounding box 606) having the table header element "Quantity" is selected for providing row anchors for the rows of the table. The column entries "10", "1", "1", "20", "5", and "100" are each located and surrounded by individual bounding boxes 620, 622, 624, 626, 628 and 630, respectively. These bounding boxes 620-630 provide the row anchor pattern that can be used to determine the number and position of the rows within the table.

FIG. 6E illustrates the exemplary document after the sixth column (surrounded by the bounding box 606) having the table header element "Unit Price" is selected for providing row anchors for the rows of the table. The column entries "1.20", "2.12", "0.56", "4.25", and "1.42", and "1.00" are each located and surrounded by individual bounding boxes 632, 634, 636, 638, 640 and 642, respectively. These bounding boxes 632-642 provide the row anchor pattern that can be used to determine the number and position of the rows within the table.

Figure 6F:
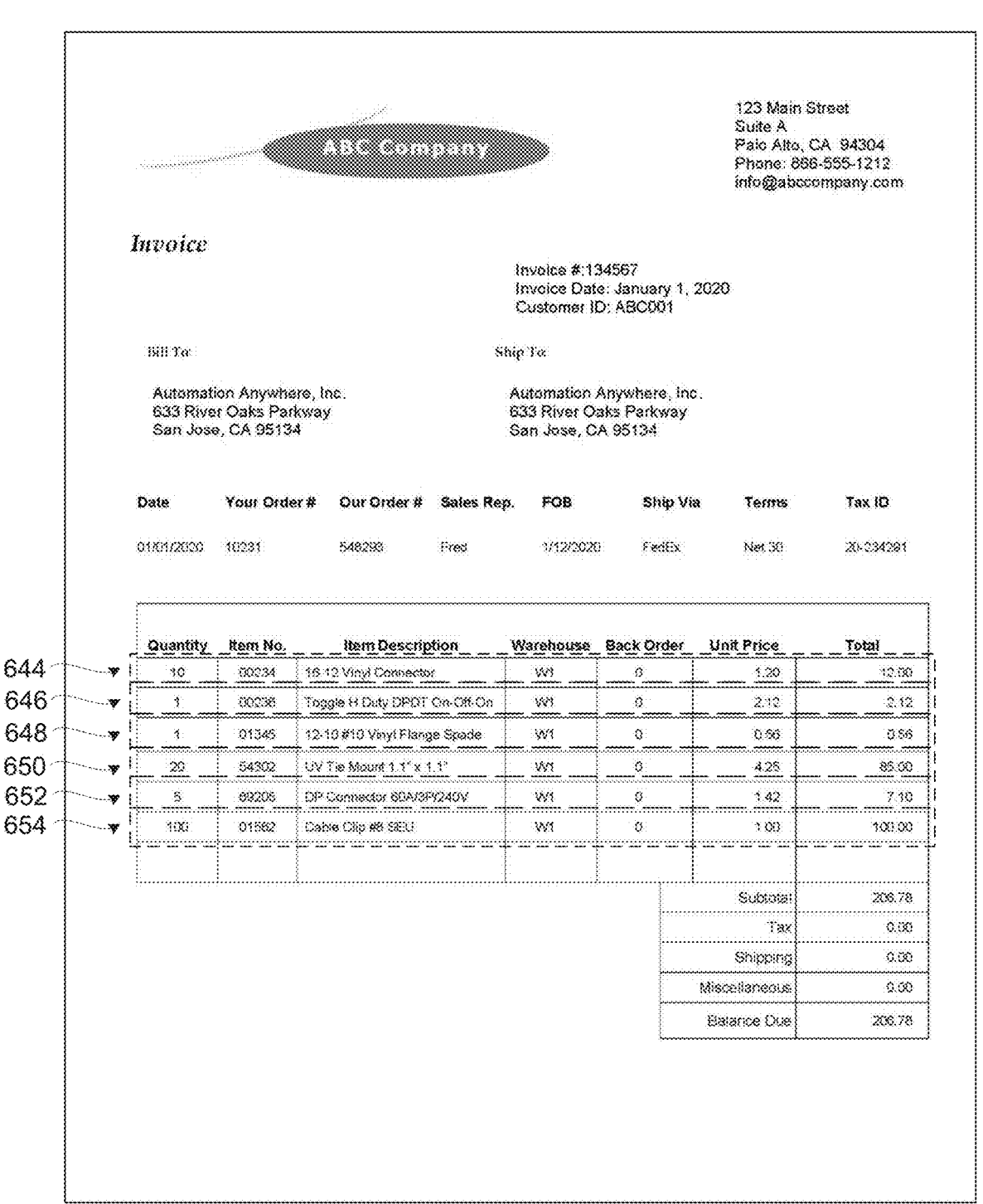
Figure 6G:
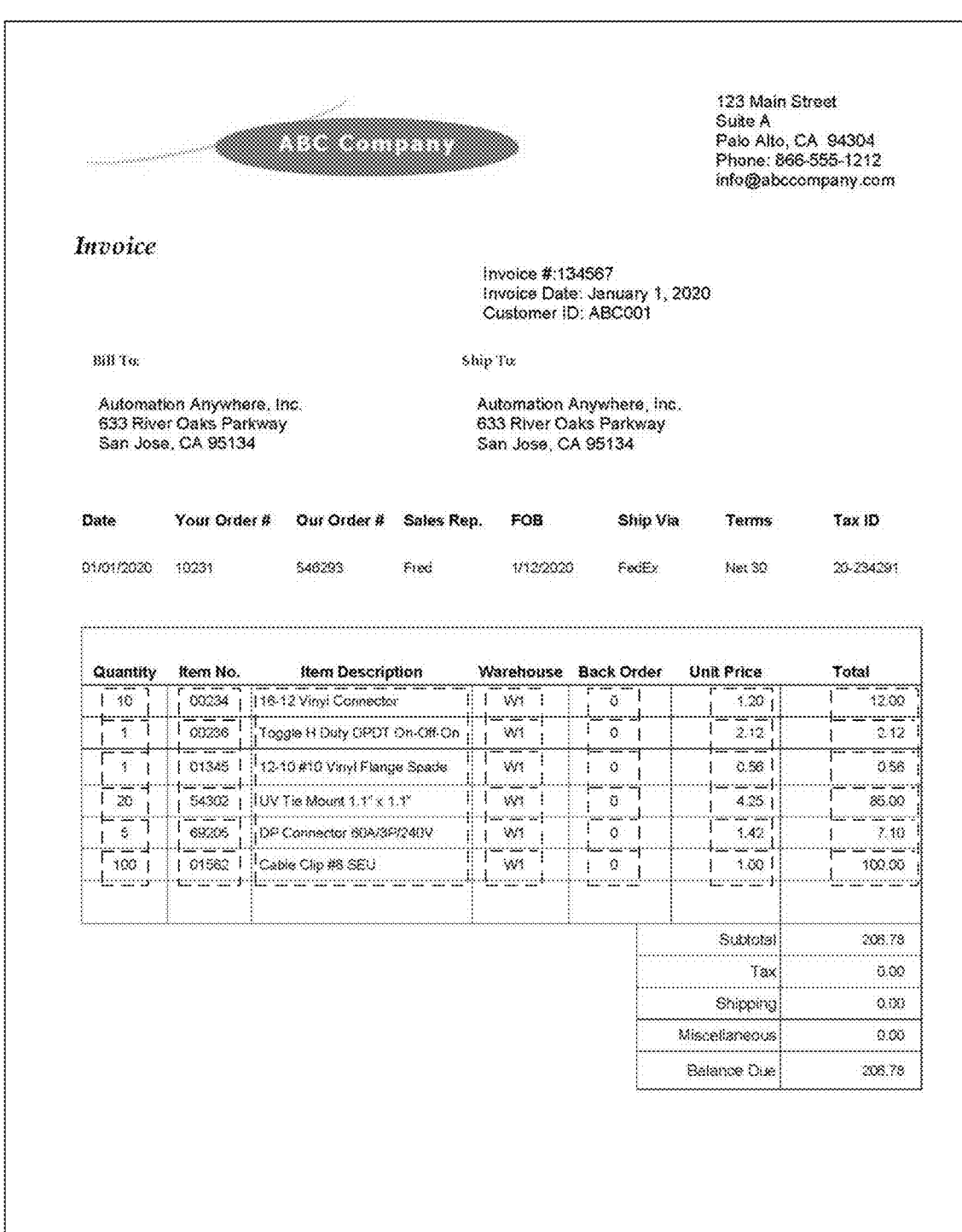

FIG. 6F illustrates the exemplary document after the rows have been identified using the selected row anchors, such as those denoted in FIG. 6E or 6F. A given row can be identified as between the top left coordinate of one of the selected row anchors to the top left coordinate of the selected row anchor that is immediately below in the same column. In this example, six rows within the table have been identified, including a first row 644, a second row 646, a third row 648, a fourth row 650, a fifth row 652 and a sixth row 654.

Figure 6H:
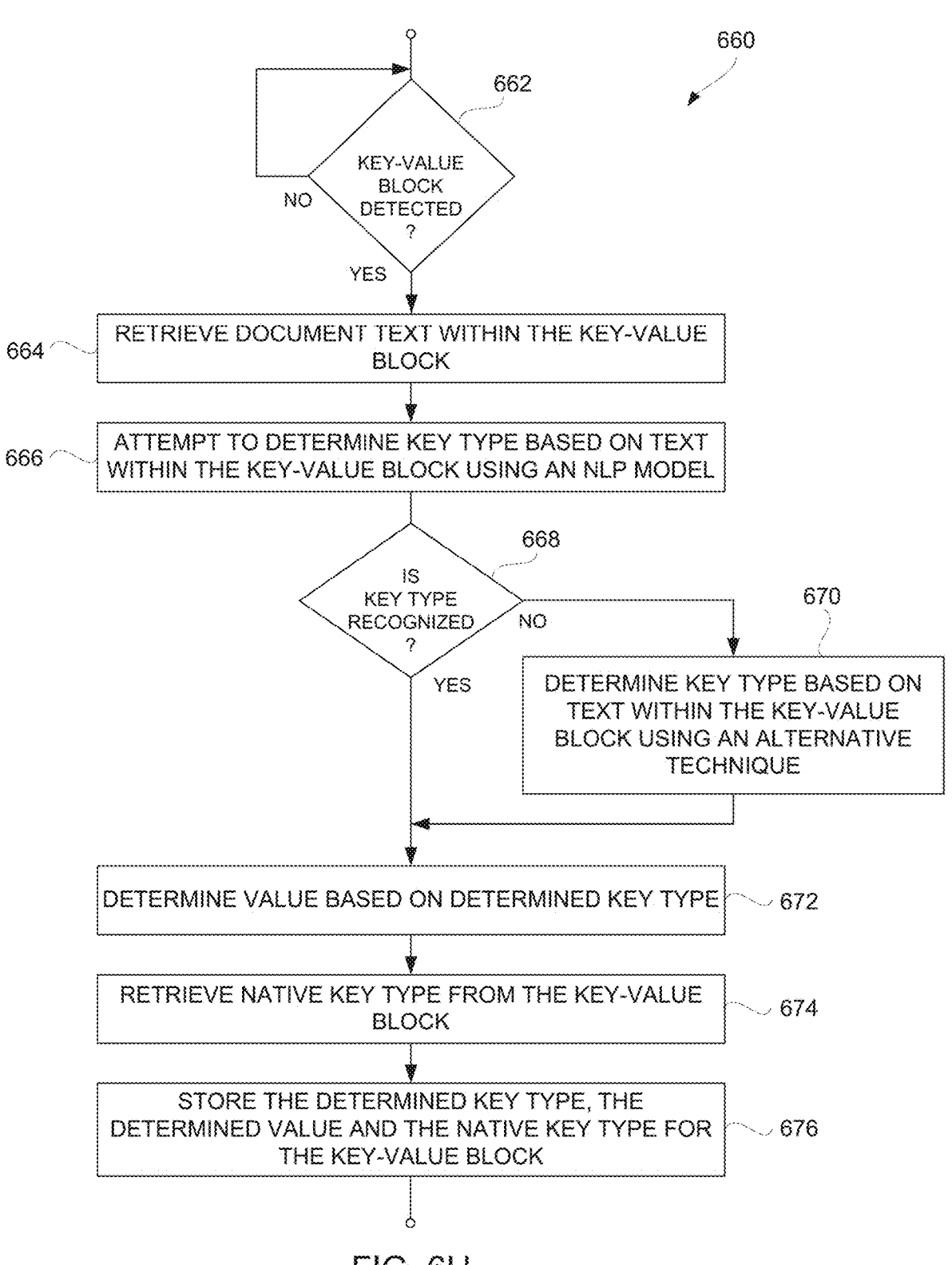
FIG. 6H is a flow diagram of a key-value block process according to one embodiment.

FIG. 6H is a flow diagram of a key-value block process 660 according to one embodiment. The key-value block process 660 can, for example, be performed by a document extraction program, such as the extraction program 106 illustrated in FIG. 1 or the performance 318 of key-value block processing illustrated in FIG. 3A.

The key-value block process 660 can begin with a decision 662 that determines whether a key-value block has been detected. When the decision 662 determines that a key-value block is not been detected, then the key-value block process 660 can await receipt of an incoming key-value block to be processed.

On the other hand, when the decision 662 determines that a key-value block has been detected, document text within the key-value block can be retrieved 664. Here, the key-value block is typically associated with a document that has been previously been processed to recognize its characters. The document is typically an image of a document, and its processing is typically referred to as Optical Character Recognition (OCR). In one implementation, the key-value block identifies a bounding box for a key-value pair. The text of interest is typically the text within the bounding box for the key-value block that has been retrieved 664.

Next, the key-value block process 660 can attempt 666 to determine a key type of the key-value pair within the key-value block based on the text within the key-value block using a Natural Language Processing (NLP) model. A NLP model is one implementation of machine learning. Natural Language Processing (NLP) is a field of Artificial intelligence (AI) that quantifies human language to make it intelligible to machines.

A decision 668 can then determine whether a key type has been recognized. When the decision 668 determines that a key type has not been recognized for the key-value block, then the key type can be determined 670 based on the text within the key-value block using an alternative technique. For example, the alternative technique could use pattern matching with respect to text or characters as well as other heuristic approaches. Following the determination 670, or directly following the decision 668 when the key type has been recognized, then a value for the key-value block can be determined 672 based on the determined key type. As an example, in a case in which the document involved is an invoice, the key-value pair provided within the key-value block can pertain to a key type of "Invoice No." and a value of "123456".

Additionally, a native key type can be retrieved 674 from the key-value block. The native key type is the particular key type utilized in the key-value block. As compared to the determined key type, the native key type is derived from the document itself, whereas the determined key type is a uniform key type that is used as a primary classification. For example, a plurality of different aliases that refer to an invoice number can all utilize the same determined key type, such as "invoice_number". Thereafter, the determined key type, the determined value and the native key type for the key-value block can all be stored 676. Following the block 676, the key-value block process 660 has completed with the recognition on the key type and value pertaining to the key-value block.

Figure 6I:
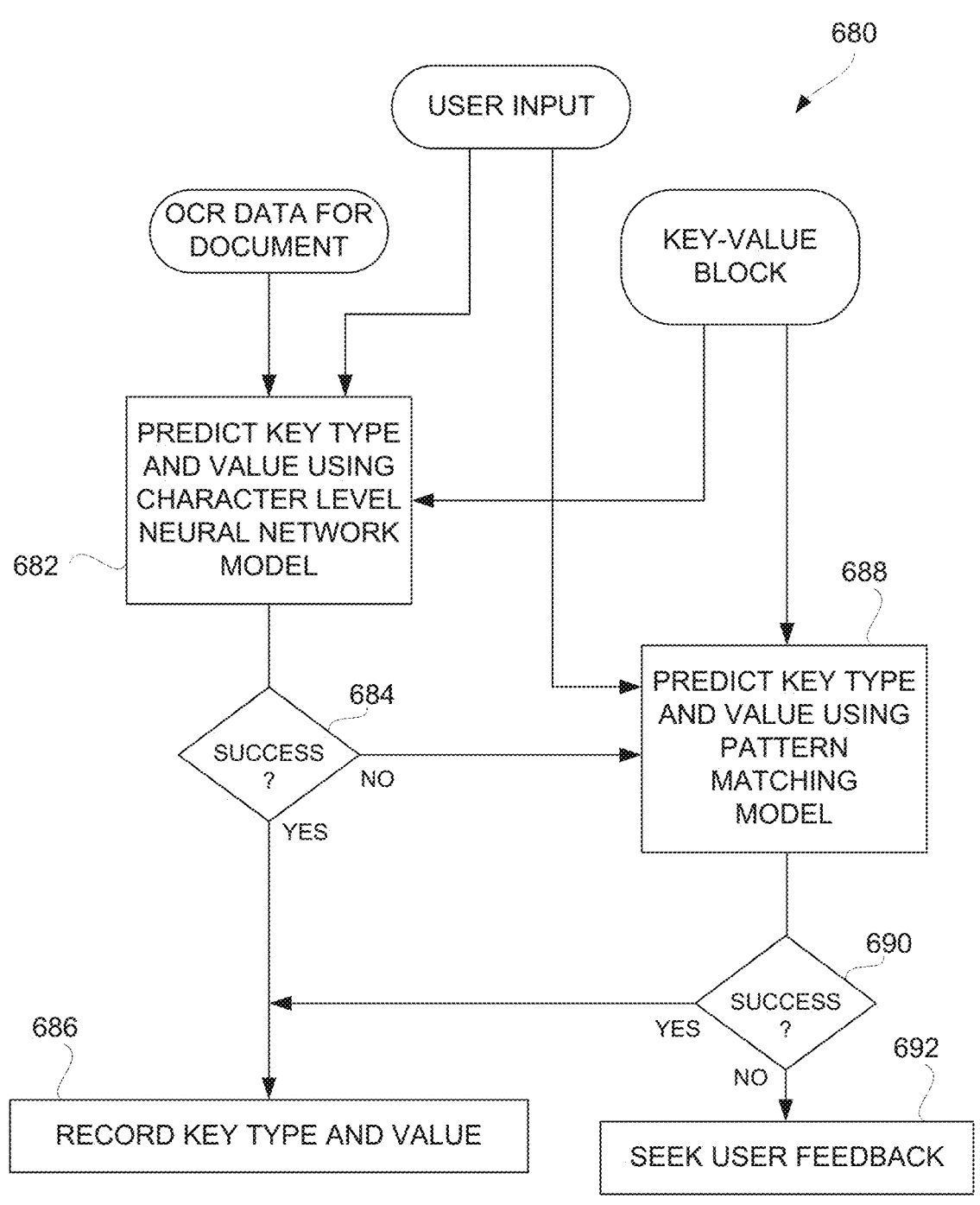
FIG. 6I is a key-value extraction system according to one embodiment.

FIG. 6I is a key-value extraction system 680 according to one embodiment. The key-value extraction system 680 can support or perform the key-value block process 660, the extraction program 106, or performance 318 of key-value block processing illustrated in FIG. 3A. The key-value extraction system 680 can also implement one or more of the blocks 208-218 illustrated in FIG. 2

The key-value extraction system 680 receives a key-value block to be processed. The key-value block is associated with a document that is being processed. The key-value extraction system 680 can also receive, request or provide OCR data for the document. Included with the OCR data would be the particular OCR data that is associated with the position of the key-value block within the document. Still further, depending upon implementation, the key-value extraction system 680 can also include or make use of a user input. For example, a user input can be a request for an extraction application to extract certain data or fields from the document. The data or fields from the document pertain to certain key-value pairs that are desired by the user.

The key-value extraction system 680 includes a character level neural network model 682 that serves to predict a key type and value for the key-value block. A decision 684 can be used to determine whether the character level neural network model 682 has been able to successfully predict the key type and value for the key-value block. When the decision 684 determines that the character level neural network model 682 has been successful, the key type and value can be recorded 686. After the key type and value have been recorded 686, the key-value extraction system 680 is complete with the key type and value having been determined and recorded.

On the other hand, when the decision 684 determines that the character level neural network model 682 has not been able to successfully predict the key type and value, a pattern matching model 688 can be used to predict key type and value for the key-value block. A decision 690 can then determine whether the pattern matching model has been successful in predicting the key type and value for the key-value block. When the decision 690 determines that the pattern matching model has been successful, then the key type and value can be recorded 686. Alternatively, when the decision 690 determines that the pattern matching model has not been able to successfully predict the key type and value, then the key-value extraction system 680 can seek user feedback 692 in a further effort to determine key type and value for the key-value block.

Optionally, the key-value extraction system 680 can receive and utilize a user input. The user input can be supplied to one or both of the neural network model 682 and the pattern matching model 688. These models 682, 688 can potentially benefit from an understanding of the user's desire to extract particular key-value information from the underlying document. The understanding of the user's desire can be utilized to ensure that the key-value extraction system 680 provides a prediction for the key type and value that are of interest to the user even in situations where the prediction may have a reduced confidence level.

In one embodiment, the character level neural network model 682 is implemented using a Character-level Convolutional Network (CharCNN) and Bidirectional Gated Recurrent Units (GRUs) Network, which is able to perform well even with misspelled words and strings lacking semantic context. Here, the character level neural network model 682 can be a Keras-based model.

As illustrated in FIG. 6I, in one embodiment, the key-value extraction system 680 can first attempt to extract key-value data from a key-value block using the neural network model 682. Then, if that is not successful, then a second attempt to extract key-value data from the key-value block can be done using the pattern matching model 688. In another embodiment, an alternative machine learning model can be attempted after the neural network model 682 is unsuccessful and before using the pattern matching model 688.

Additional details on detecting objects can be found in DETECTION OF USER INTERFACE CONTROLS VIA INVARIANCE GUIDED SUB-CONTROL LEARNING, U.S. application Ser. No. 16/876,530, filed May 18, 2020, which is hereby incorporated by reference herein.

The various aspects disclosed herein can be utilized with or by robotic process automation systems. Exemplary robotic process automation systems and operations thereof are detailed below.

Figure 7:
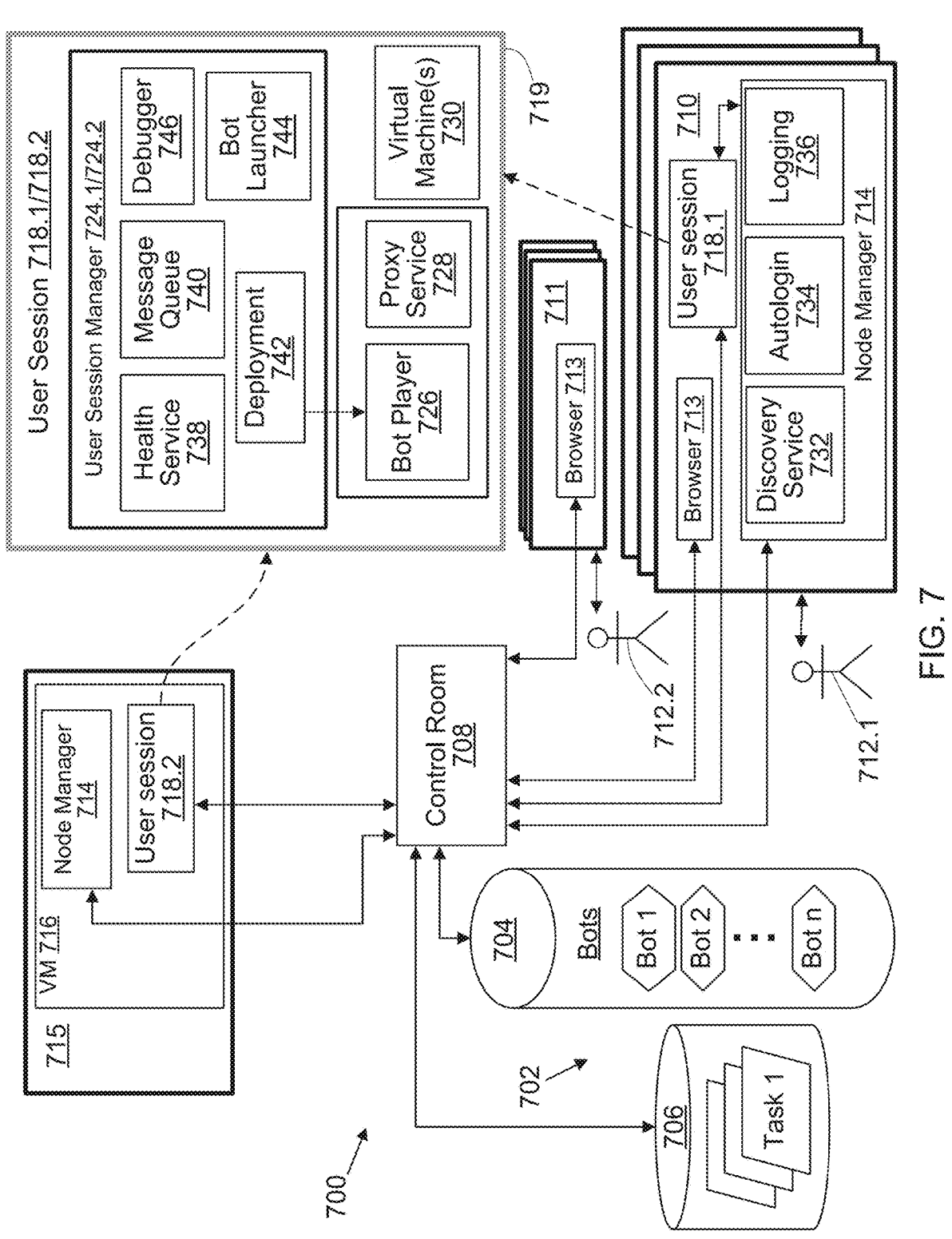
FIG. 7 is a block diagram of a Robotic Process Automation (RPA) system according to one embodiment.

FIG. 7 is a block diagram of a robotic process automation (RPA) system 700 according to one embodiment. The RPA system 700 includes data storage 702. The data storage 702 can store a plurality of software robots 704, also referred to as bots (e.g., Bot 1, Bot 2, . . . , Bot n, where n is an integer). The software robots 704 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 726), on which a bot will execute or is executing. The data storage 702 can also stores a plurality of work items 706. Each work item 706 can pertain to processing executed by one or more of the software robots 704.

The RPA system 700 can also include a control room 708. The control room 708 is operatively coupled to the data storage 702 and is configured to execute instructions that, when executed, cause the RPA system 700 to respond to a request from a client device 710 that is issued by a user 712.1. The control room 708 can act as a server to provide to the client device 710 the capability to perform an automation task to process a work item from the plurality of work items 706. The RPA system 700 is able to support multiple client devices 710 concurrently, each of which will have one or more corresponding user session(s) 718, which provides a context. The context can, for example, include security, permissions, audit trails, etc. to define the permissions and roles for bots operating under the user session 718. For example, a bot executing under a user session, cannot access any files or use any applications that the user, under whose credentials the bot is operating, does not have permission to do so. This prevents any inadvertent or malicious acts from a bot under which bot 704 executes.

The control room 708 can provide, to the client device 710, software code to implement a node manager 714. The node manager 714 executes on the client device 710 and provides a user 712 a visual interface via browser 713 to view progress of and to control execution of automation tasks. It should be noted that the node manager 714 can be provided to the client device 710 on demand, when required by the client device 710, to execute a desired automation task. In one embodiment, the node manager 714 may remain on the client device 710 after completion of the requested automation task to avoid the need to download it again. In another embodiment, the node manager 714 may be deleted from the client device 710 after completion of the requested automation task. The node manager 714 can also maintain a connection to the control room 708 to inform the control room 708 that device 710 is available for service by the control room 708, irrespective of whether a live user session 718 exists. When executing a bot 704, the node manager 714 can impersonate the user 712 by employing credentials associated with the user 712.

The control room 708 initiates, on the client device 710, a user session 718 (seen as a specific instantiation 718.1) to perform the automation task. The control room 708 retrieves the set of task processing instructions 704 that correspond to the work item 706. The task processing instructions 704 that correspond to the work item 706 can execute under control of the user session 718.1, on the client device 710. The node manager 714 can provide update data indicative of status of processing of the work item to the control room 708. The control room 708 can terminate the user session 718.1 upon completion of processing of the work item 706. The user session 718.1 is shown in further detail at 719, where an instance 724.1 of user session manager 724 is seen along with a bot player 726, proxy service 728, and one or more virtual machine(s) 730, such as a virtual machine that runs Java® or Python®. The user session manager 724 provides a generic user session context within which a bot 704 executes.

The bots 704 execute on a bot player, via a computing device, to perform the functions encoded by the bot. Some or all of the bots 704 may, in certain embodiments, be located remotely from the control room 708. Moreover, the devices 710 and 711, which may be conventional computing devices, such as for example, personal computers, server computers, laptops, tablets and other portable computing devices, may also be located remotely from the control room 708. The devices 710 and 711 may also take the form of virtual computing devices. The bots 704 and the work items 706 are shown in separate containers for purposes of illustration but they may be stored in separate or the same device(s), or across multiple devices. The control room 708 can perform user management functions, source control of the bots 704, along with providing a dashboard that provides analytics and results of the bots 704, performs license management of software required by the bots 704 and manages overall execution and management of scripts, clients, roles, credentials, security, etc. The major functions performed by the control room 708 can include: (i) a dashboard that provides a summary of registered/active users, tasks status, repository details, number of clients connected, number of scripts passed or failed recently, tasks that are scheduled to be executed and those that are in progress, and any other desired information; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 708 is shown generally for simplicity of explanation. Multiple instances of the control room 708 may be employed where large numbers of bots are deployed to provide for scalability of the RPA system 700.

In the event that a device, such as device 711 (e.g., operated by user 712.2) does not satisfy the minimum processing capability to run a node manager 714, the control room 708 can make use of another device, such as device 715, that has the requisite capability. In such case, a node manager 714 within a Virtual Machine (VM), seen as VM 716, can be resident on the device 715. The node manager 714 operating on the device 715 can communicate with browser 713 on device 711. This approach permits RPA system 700 to operate with devices that may have lower processing capability, such as older laptops, desktops, and portable/mobile devices such as tablets and mobile phones. In certain embodiments the browser 713 may take the form of a mobile application stored on the device 711. The control room 708 can establish a user session 718.2 for the user 712.2 while interacting with the control room 708 and the corresponding user session 718.2 operates as described above for user session 718.1 with user session manager 724 operating on device 710 as discussed above.

In certain embodiments, the user session manager 724 provides five functions. First is a health service 738 that maintains and provides a detailed logging of bot execution including monitoring memory and CPU usage by the bot and other parameters such as number of file handles employed. The bots 704 can employ the health service 738 as a resource to pass logging information to the control room 708. Execution of the bot is separately monitored by the user session manager 724 to track memory, CPU, and other system information. The second function provided by the user session manager 724 is a message queue 740 for exchange of data between bots executed within the same user session 718. The third function is a deployment service (also referred to as a deployment module) 742 that connects to the control room 708 to request execution of a requested bot 704. The deployment service 742 can also ensure that the environment is ready for bot execution, such as by making available dependent libraries. The fourth function is a bot launcher 744 which can read metadata associated with a requested bot 704 and launch an appropriate container and begin execution of the requested bot. The fifth function is a debugger service 746 that can be used to debug bot code.

The bot player 726 can execute, or play back, a sequence of instructions encoded in a bot. The sequence of instructions can, for example, be captured by way of a recorder when a human performs those actions, or alternatively the instructions are explicitly coded into the bot. These instructions enable the bot player 726, to perform the same actions as a human would do in their absence. In one implementation, the instructions can compose of a command (or action) followed by set of parameters. For example, Open Browser is a command and a URL would be the parameter for it to launch a web resource. Proxy service 728 can enable integration of external software or applications with the bot to provide specialized services. For example, an externally hosted artificial intelligence system can enable the bot to understand the meaning of a "sentence."

The user 712.1 can interact with node manager 714 via a conventional browser 713 which employs the node manager 714 to communicate with the control room 708. When the user 712.1 logs in from the client device 710 to the control room 708 for the first time, the user 712.1 can be prompted to download and install the node manager 714 on the device 710, if one is not already present. The node manager 714 can establish a web socket connection to the user session manager 724, deployed by the control room 708 that lets the user 712.1 subsequently create, edit, and deploy the bots 704.

Figure 8:
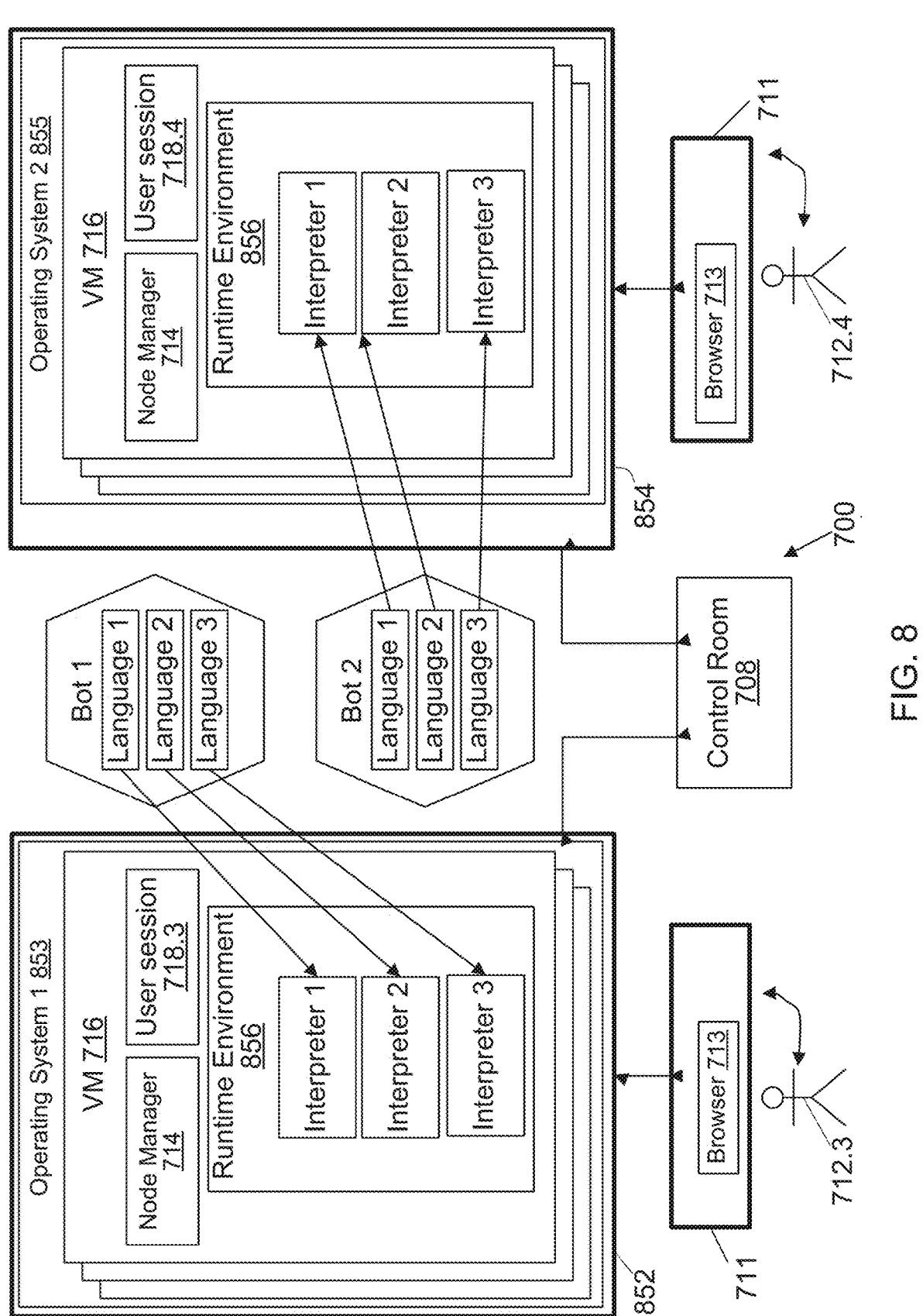
FIG. 8 is a block diagram of a generalized runtime environment for bots in accordance with another embodiment of the RPA system illustrated in FIG. 7.

FIG. 8 is a block diagram of a generalized runtime environment for bots 704 in accordance with another embodiment of the RPA system 700 illustrated in FIG. 7. This flexible runtime environment advantageously permits extensibility of the platform to enable use of various languages in encoding bots. In the embodiment of FIG. 8, RPA system 700 generally operates in the manner described in connection with FIG. 7, except that in the embodiment of FIG. 8, some or all of the user sessions 718 execute within a virtual machine 716. This permits the bots 704 to operate on an RPA system 700 that runs on an operating system different from an operating system on which a bot 704 may have been developed. For example, if a bot 704 is developed on the Windows® operating system, the platform agnostic embodiment shown in FIG. 8 permits the bot 704 to be executed on a device 852 or 854 executing an operating system 853 or 855 different than Windows®, such as, for example, Linux. In one embodiment, the VM 716 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 8, multiple devices 852 can execute operating system 1, 853, which may, for example, be a Windows® operating system. Multiple devices 854 can execute operating system 2, 855, which may, for example, be a Linux® operating system. For simplicity of explanation, two different operating systems are shown, by way of example and additional operating systems such as the macOS®, or other operating systems may also be employed on devices 852, 854 or other devices. Each device 852, 854 has installed therein one or more VM's 716, each of which can execute its own operating system (not shown), which may be the same or different than the host operating system 853/855. Each VM 716 has installed, either in advance, or on demand from control room 708, a node manager 714. The embodiment illustrated in FIG. 8 differs from the embodiment shown in FIG. 7 in that the devices 852 and 854 have installed thereon one or more VMs 716 as described above, with each VM 716 having an operating system installed that may or may not be compatible with an operating system required by an automation task. Moreover, each VM has installed thereon a runtime environment 856, each of which has installed thereon one or more interpreters (shown as interpreter 1, interpreter 2, interpreter 3). Three interpreters are shown by way of example but any run time environment 856 may, at any given time, have installed thereupon less than or more than three different interpreters. Each interpreter 856 is specifically encoded to interpret instructions encoded in a particular programming language. For example, interpreter 1 may be encoded to interpret software programs encoded in the Java® programming language, seen in FIG. 8 as language 1 in Bot 1 and Bot 2. Interpreter 2 may be encoded to interpret software programs encoded in the Python® programming language, seen in FIG. 8 as language 2 in Bot 1 and Bot 2, and interpreter 3 may be encoded to interpret software programs encoded in the R programming language, seen in FIG. 8 as language 3 in Bot 1 and Bot 2.

Turning to the bots Bot 1 and Bot 2, each bot may contain instructions encoded in one or more programming languages. In the example shown in FIG. 8, each bot can contain instructions in three different programming languages, for example, Java®, Python® and R. This is for purposes of explanation and the embodiment of FIG. 8 may be able to create and execute bots encoded in more or less than three programming languages. The VMs 716 and the runtime environments 856 permit execution of bots encoded in multiple languages, thereby permitting greater flexibility in encoding bots. Moreover, the VMs 716 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 708 will select a device with a VM 716 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 9:
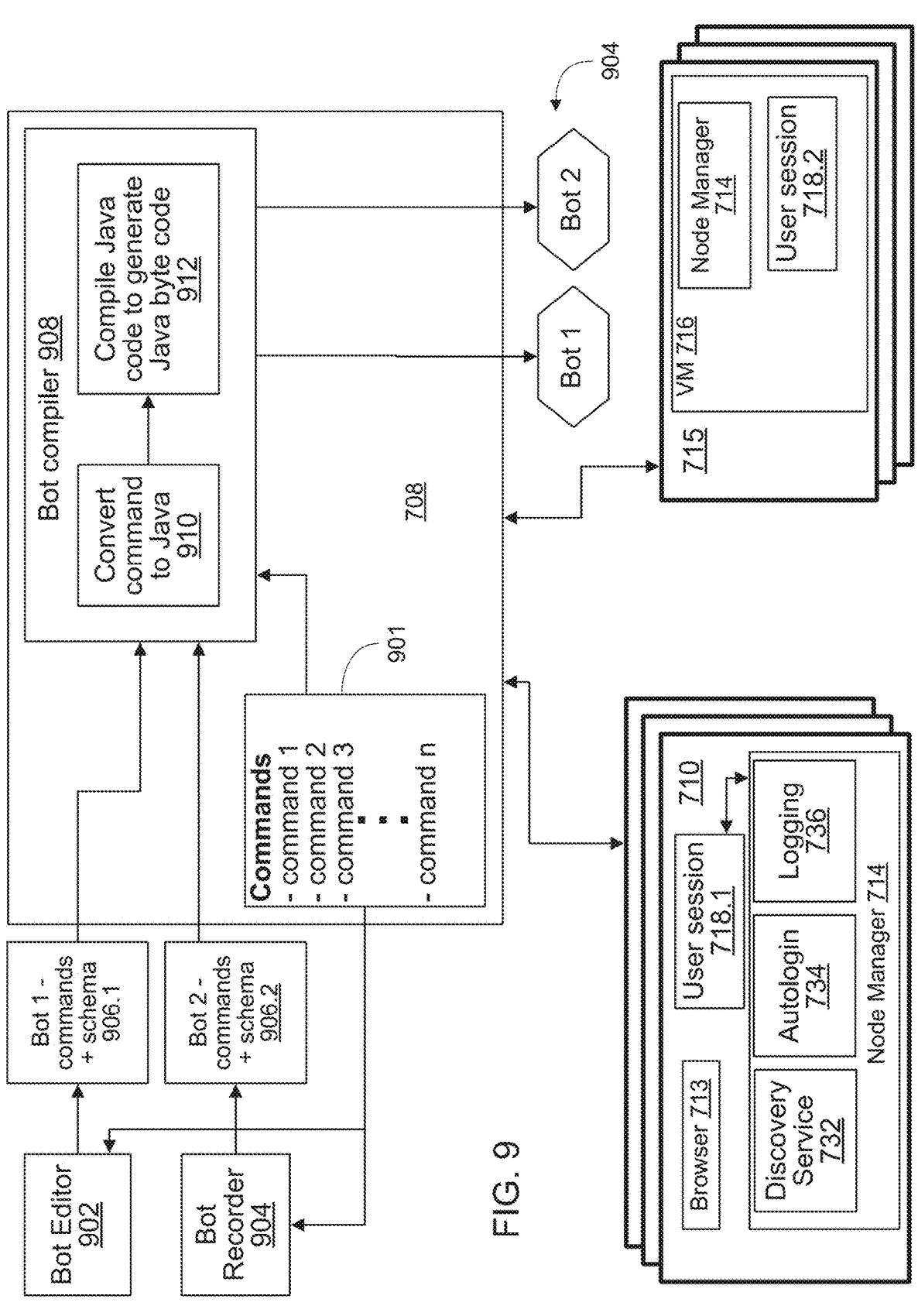
FIG. 9 illustrates a block diagram of yet another embodiment of the RPA system of FIG. 7 configured to provide platform independent sets of task processing instructions for bots.

FIG. 9 illustrates a block diagram of yet another embodiment of the RPA system 700 of FIG. 7 configured to provide platform independent sets of task processing instructions for bots 704. Two bots 704, bot 1 and bot 2 are shown in FIG. 9. Each of bots 1 and 2 are formed from one or more commands 901, each of which specifies a user level operation with a specified application program, or a user level operation provided by an operating system. Sets of commands 906.1 and 906.2 may be generated by bot editor 902 and bot recorder 904, respectively, to define sequences of application level operations that are normally performed by a human user. The bot editor 902 may be configured to combine sequences of commands 901 via an editor. The bot recorder 904 may be configured to record application level operations performed by a user and to convert the operations performed by the user to commands 901. The sets of commands 906.1 and 906.2 generated by the editor 902 and the recorder 904 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 708 operates to compile, via compiler 908, the sets of commands generated by the editor 902 or the recorder 904 into platform independent executables, each of which is also referred to herein as a bot JAR (Java ARchive) that perform application level operations captured by the bot editor 902 and the bot recorder 904. In the embodiment illustrated in FIG. 9, the set of commands 906, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 710 and/or 715 to perform the encoded application level operations that are normally performed by a human user.

Figure 10:
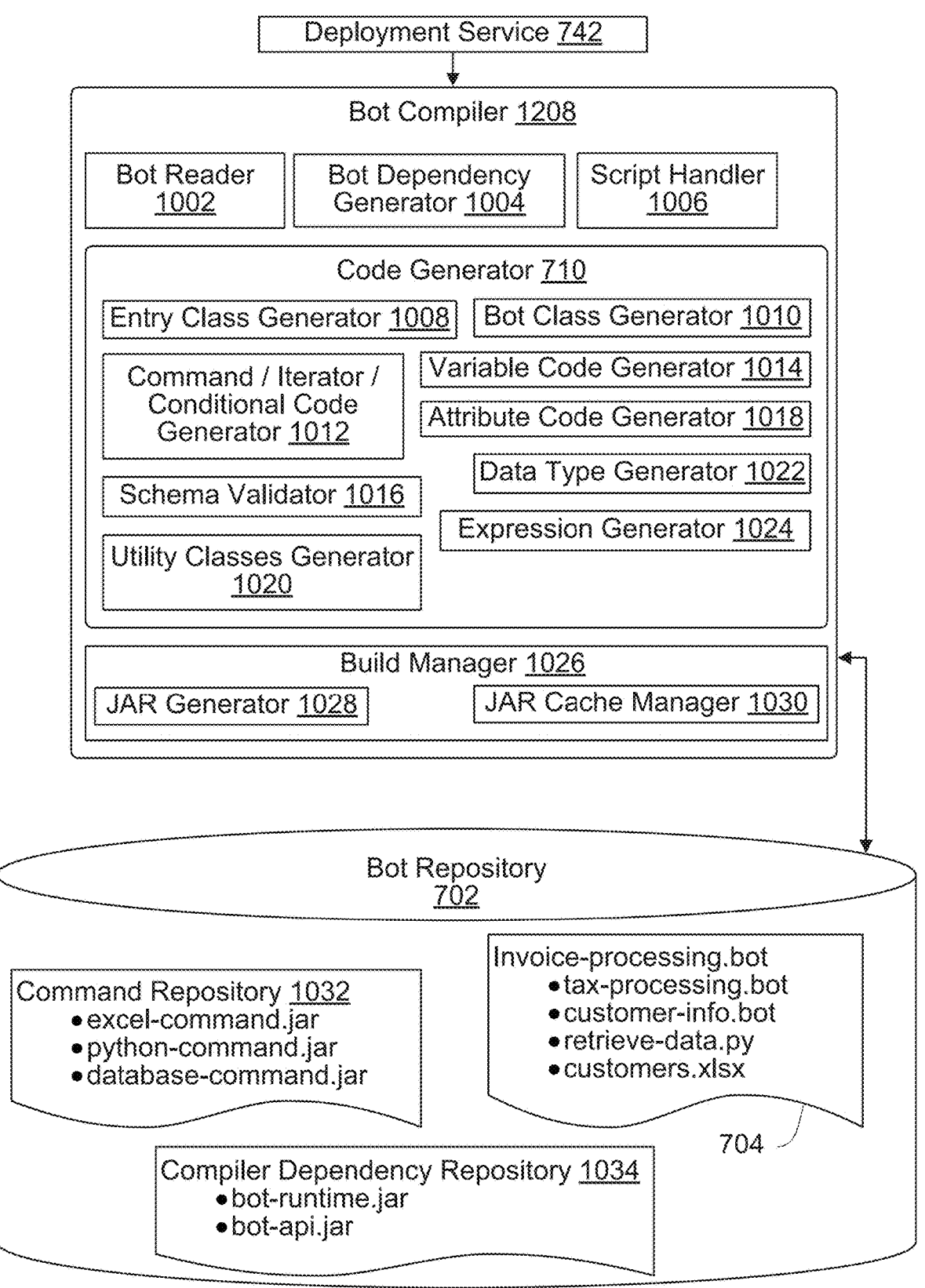
FIG. 10 is a block diagram illustrating details of one embodiment of the bot compiler illustrated in FIG. 9.

FIG. 10 is a block diagram illustrating details of one embodiment of the bot compiler 908 illustrated in FIG. 9. The bot compiler 908 accesses one or more of the bots 704 from the data storage 702, which can serve as bot repository, along with commands 901 that are contained in a command repository 1032. The bot compiler 708 can also access compiler dependency repository 1034. The bot compiler 708 can operate to convert each command 901 via code generator module 910 to an operating system independent format, such as a Java command. The bot compiler 708 then compiles each operating system independent format command into byte code, such as Java byte code, to create a bot JAR. The convert command to Java module 910 is shown in further detail in in FIG. 10 by JAR generator 1028 of a build manager 1026. The compiling to generate Java byte code module 912 can be provided by the JAR generator 1028. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 9, deployment service 742 can be responsible to trigger the process of bot compilation and then once a bot has compiled successfully, to execute the resulting bot JAR on selected devices 710 and/or 715. The bot compiler 908 can comprises a number of functional modules that, when combined, generate a bot 704 in a JAR format. A bot reader 1002 loads a bot file into memory with class representation. The bot reader 1002 takes as input a bot file and generates an in-memory bot structure. A bot dependency generator 1004 identifies and creates a dependency graph for a given bot. It includes any child bot, resource file like script, and document or image used while creating a bot. The bot dependency generator 1004 takes, as input, the output of the bot reader 1002 and provides, as output, a list of direct and transitive bot dependencies. A script handler 1006 handles script execution by injecting a contract into a user script file. The script handler 1006 registers an external script in manifest and bundles the script as a resource in an output JAR. The script handler 1006 takes, as input, the output of the bot reader 1002 and provides, as output, a list of function pointers to execute different types of identified scripts like Python, Java, VB scripts.

An entry class generator 1008 can create a Java class with an entry method, to permit bot execution to be started from that point. For example, the entry class generator 1008 takes, as an input, a parent bot name, such "Invoice-processing.bot" and generates a Java class having a contract method with a predefined signature. A bot class generator 1010 can generate a bot class and orders command code in sequence of execution. The bot class generator 1010 can take, as input, an in-memory bot structure and generates, as output, a Java class in a predefined structure. A Command/ Iterator/Conditional Code Generator 1012 wires up a command class with singleton object creation, manages nested command linking, iterator (loop) generation, and conditional (If/Else If/Else) construct generation. The Command/Iterator/Conditional Code Generator 1012 can take, as input, an in-memory bot structure in JSON format and generates Java code within the bot class. A variable code generator 1014 generates code for user defined variables in the bot, maps bot level data types to Java language compatible types, and assigns initial values provided by user. The variable code generator 1014 takes, as input, an in-memory bot structure and generates Java code within the bot class. A schema validator 1016 can validate user inputs based on command schema and includes syntax and semantic checks on user provided values. The schema validator 1016 can take, as input, an in-memory bot structure and generates validation errors that it detects. The attribute code generator 1018 can generate attribute code, handles the nested nature of attributes, and transforms bot value types to Java language compatible types. The attribute code generator 1018 takes, as input, an in-memory bot structure and generates Java code within the bot class. A utility classes generator 1020 can generate utility classes which are used by an entry class or bot class methods. The utility classes generator 1020 can generate, as output, Java classes. A data type generator 1022 can generate value types useful at runtime. The data type generator 1022 can generate, as output, Java classes. An expression generator 1024 can evaluate user inputs and generates compatible Java code, identifies complex variable mixed user inputs, inject variable values, and transform mathematical expressions. The expression generator 1024 can take, as input, user defined values and generates, as output, Java compatible expressions.

The JAR generator 1028 can compile Java source files, produces byte code and packs everything in a single JAR, including other child bots and file dependencies. The JAR generator 1028 can take, as input, generated Java files, resource files used during the bot creation, bot compiler dependencies, and command packages, and then can generate a JAR artifact as an output. The JAR cache manager 1030 can put a bot JAR in cache repository so that recompilation can be avoided if the bot has not been modified since the last cache entry. The JAR cache manager 1030 can take, as input, a bot JAR.

In one or more embodiment described herein command action logic can be implemented by commands 901 available at the control room 708. This permits the execution environment on a device 710 and/or 715, such as exists in a user session 718, to be agnostic to changes in the command action logic implemented by a bot 704. In other words, the manner in which a command implemented by a bot 704 operates need not be visible to the execution environment in which a bot 704 operates. The execution environment is able to be independent of the command action logic of any commands implemented by bots 704. The result is that changes in any commands 901 supported by the RPA system 700, or addition of new commands 901 to the RPA system 700, do not require an update of the execution environment on devices 710, 715. This avoids what can be a time and resource intensive process in which addition of a new command 901 or change to any command 901 requires an update to the execution environment to each device 710, 715 employed in a RPA system. Take, for example, a bot that employs a command 901 that logs into an on-online service. The command 901 upon execution takes a Uniform Resource Locator (URL), opens (or selects) a browser, retrieves credentials corresponding to a user on behalf of whom the bot is logging in as, and enters the user credentials (e.g., username and password) as specified. If the command 901 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 11:
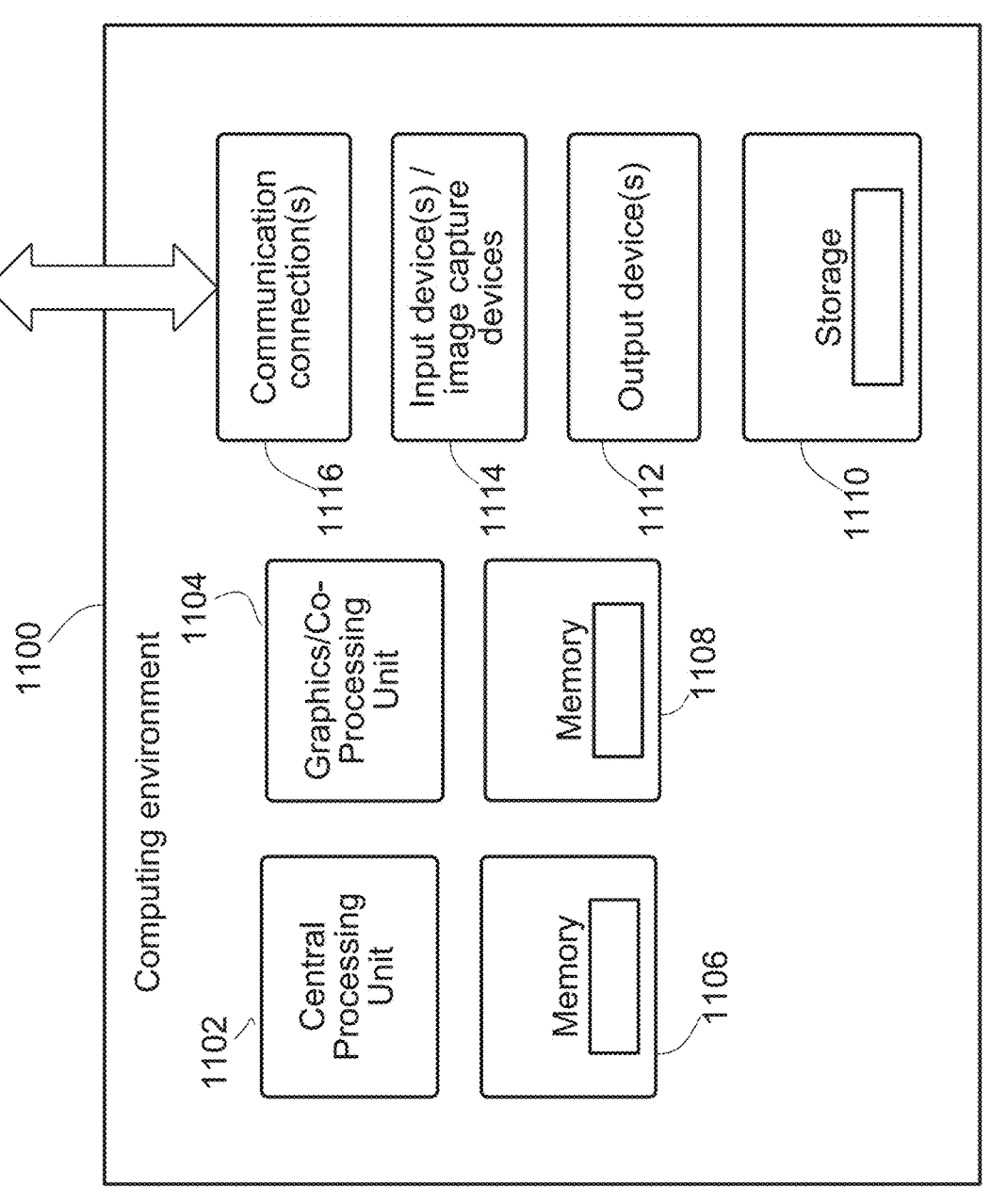
FIG. 11 illustrates a block diagram of an exemplary computing environment for an implementation of an RPA system, such as the RPA systems disclosed herein.

FIG. 11 illustrates a block diagram of an exemplary computing environment 1100 for an implementation of an RPA system, such as the RPA systems disclosed herein. The embodiments described herein may be implemented using the exemplary computing environment 1100. The exemplary computing environment 1100 includes one or more processing units 1102, 1104 and memory 1106, 1108. The processing units 1102, 1106 execute computer-executable instructions. Each of the processing units 1102, 1106 can be a general-purpose central processing unit (CPU), processor in an application-specific integrated circuit (ASIC) or any other type of processor. For example, as shown in FIG. 11, the processing unit 1102 can be a CPU, and the processing unit can be a graphics/co-processing unit (GPU). The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1100 may be rearranged in various embodiments, and some embodiments may not require nor include all of the above components, while other embodiments may include additional components, such as specialized processors and additional memory.

The exemplary computing environment 1100 may have additional features such as, for example, tangible storage 1110, one or more input devices 1114, one or more output devices 1112, and one or more communication connections 1116. An interconnection mechanism (not shown) such as a bus, controller, or network can interconnect the various components of the exemplary computing environment 1100. Typically, operating system software (not shown) provides an operating system for other software executing in the exemplary computing environment 1100, and coordinates activities of the various components of the exemplary computing environment 1100.

The tangible storage 1110 may be removable or non-removable, and includes magnetic disks, magnetic tapes or cassettes, CD-ROMs, DVDs, or any other medium which can be used to store information in a non-transitory way, and which can be accessed within the computing system 1100. The tangible storage 1110 can store instructions for the software implementing one or more features of a PRA system as described herein.

The input device(s) or image capture device(s) 1114 may include, for example, one or more of a touch input device such as a keyboard, mouse, pen, or trackball, a voice input device, a scanning device, an imaging sensor, touch surface, or any other device capable of providing input to the exemplary computing environment 1100. For multimedia embodiment, the input device(s) 1114 can, for example, include a camera, a video card, a TV tuner card, or similar device that accepts video input in analog or digital form, a microphone, an audio card, or a CD-ROM or CD-RW that reads audio/video samples into the exemplary computing environment 1100. The output device(s) 1112 can, for example, include a display, a printer, a speaker, a CD-writer, or any another device that provides output from the exemplary computing environment 1100.

The one or more communication connections 1116 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A document extraction system for extracting content from documents, comprising:
an object detection component that receives a document image for a document to be processed, determines a plurality of object blocks of the document, and outputs the plurality of object blocks, each of the object blocks having a block type that denotes a type of object block;
a plurality of data extraction components, each of the data extraction components being associated with extraction of data from object blocks with different block types, the different block types including at least a key-value block, a key information block, and a table block;
an object classifier operatively connected to the object detection component, the object classifier configured to direct different ones of the object blocks of the document to different ones of the data extraction components based on at least the block type corresponding to the different ones of the object blocks; and
an aggregator operatively connected to the data extraction components, the aggregator configured to receive extracted data from the data extraction components, combine the received extracted data from the data extraction components into a single structured data file containing the resulting data extraction for the document, wherein at least one of the data extraction components uses a Natural Language Processing Model trained for data extraction of data from object blocks of a particular block type.

2. A document extraction system as recited in claim 1, wherein at least one of the different block types includes a graphic block.

3. A document extraction system as recited in claim 2, wherein at least one of the data extraction components uses a first Natural Language Processing Model trained for data extraction of data from object blocks of a first particular block type, and wherein at least one of the data extraction components uses a second Natural Language Processing Model trained for data extraction of data from object blocks of a second particular block type.

4. A document extraction system as recited in claim 1, wherein at least one of the data extraction components uses a first Natural Language Processing Model trained for data extraction of data from object blocks of a first particular block type, and wherein at least one of the data extraction components uses a second Natural Language Processing Model trained for data extraction of data from object blocks of a second particular block type.

5. A computer-implemented method for extracting content from documents, the method comprising:

receiving a document to be processed, the document being received as a digital image;

determining object blocks in the document, each of the detected object blocks being denoted by an object type;

determining data extraction processing to be perform for a given one of each of the detected object blocks based on the object type associated therewith;

performing the determined data extraction on the detected object blocks as determined based on the object type, wherein the detected object blocks that have different object types are processed differently, the different block types including at least two or more of a key-value block, a key information block, and a table block, the performing of the determined data extraction separately produces extracted data from the detected object blocks; and combining the data extraction separately produced from the detected object blocks into a data extraction file for the document, the data extraction file being a single structured data file containing the resulting data extraction from the detected object blocks in the document, wherein the determined data extraction performed for at least one on the object types uses a machine learned model, and wherein the determined data extraction performed for at least one of the object types uses a first machine learned model, and wherein the determined data extraction performed for at least another one of the object types uses a second machine learned model.

6. A computer-implemented method as recited in claim 5, wherein the first machined learned model and the second machined learned model are both based on an NLP model.

7. A computer-implemented method as recited in claim 5, wherein the determined data extraction performed for at least one on the object types uses artificial intelligence.

8. A computing system for robotic process automation, comprising:

a document extraction sub-system for extracting content from documents, comprising:

an object detection component that receives a document image for a document to be processed, detects a plurality of object blocks within the document, and outputs the plurality of object blocks, each of the object blocks having a block type that denotes a type of object block;

a plurality of data extraction components, each of the data extraction components being associated with extraction of data from object blocks with different block types, the different block types including a key-value block, a key information block, a table block, or a graphic block;

an object classifier operatively connected to the object detection component, the object classifier configured to direct different ones of the object blocks of the document to different ones of the data extraction components based on at least the block type corresponding to the different ones of the object blocks; and an aggregator operatively connected to the data extraction components, the aggregator configured to receive extracted data from the different ones of the data extraction components, combine the received extracted data from the different ones of the data extraction components into a resulting data extraction for the document, and output a single structured data file containing the resulting data extraction for the document.

9. A computing system as recited in claim 8, wherein the object blocks detected from the document include at least one table block and at least one key-value block.

10. A computing system as recited in claim 8, wherein the object blocks detected from the document include at least a table block, a key-value block, and a key information block.

11. A computing system as recited in claim 8, wherein each of the object blocks detected from the document includes the object type, a bounding box for the object block, and a position reference of the object block on the document.

12. A non-transitory computer readable medium including computer program code tangibly stored therein for extracting content from documents, the computer readable medium comprising:

computer program code for receiving a document to be processed, the document being received as a digital image;

computer program code for determining object blocks in the document, each of the detected object blocks being denoted by an object type, wherein a plurality of the detected object blocks are other than text blocks, the determined data extraction is separately performed to obtained extracted data;

computer program code for determining data extraction processing to be perform for a given one of each of the detected object blocks based on the object type associated therewith;

computer program code for performing the determined data extraction on the detected object blocks as determined based on the object type, wherein for each of more than one of the detected object blocks, the determined data extraction is separately performed to obtain extracted data, and wherein the detected object blocks that have different object types are processed differently; and computer program code for aggregating the extracted data for each of the more than one of the detected object blocks into a single structured data file containing the extracted data for each of the more than one of the detected object blocks, wherein the computer program code for performing the determined data extraction on the detected object blocks uses for at least one of the object blocks, a Natural Language Processing Model trained for data extraction of data from an object block based on a particular block type for the object block.

* * * * *